(12) United States Patent
Takeda et al.

(10) Patent No.: US 11,219,056 B2
(45) Date of Patent: Jan. 4, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Qin Mu, Beijing (CN); Liu Liu, Beijing (CN); Chongning Na, Beijing (CN); Xin Wang, Beijing (CN); Jing Wang, Beijing (CN); Lihui Wang, Beijing (CN); Min Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 11 days.

(21) Appl. No.: 16/494,426

(22) PCT Filed: Mar. 17, 2017

(86) PCT No.: PCT/JP2017/010985
§ 371 (c)(1),
(2) Date: Sep. 16, 2019

(87) PCT Pub. No.: WO2018/167958
PCT Pub. Date: Sep. 20, 2018

(65) Prior Publication Data
US 2021/0120574 A1 Apr. 22, 2021

(51) Int. Cl.
*H04W 72/12* (2009.01)
*H04W 72/04* (2009.01)

(52) U.S. Cl.
CPC ..... *H04W 72/1289* (2013.01); *H04W 72/042* (2013.01); *H04W 72/0446* (2013.01); *H04W 72/0493* (2013.01)

(58) Field of Classification Search
CPC .......... H04W 72/1289; H04W 72/042; H04W 72/0446; H04W 72/0493
(Continued)

(56) References Cited

U.S. PATENT DOCUMENTS

2010/0208684 A1* 8/2010 Cho ............... H04L 5/0094
370/329
2013/0235784 A1* 9/2013 Kim ............... H04L 12/189
370/312

(Continued)

FOREIGN PATENT DOCUMENTS

| EP | 3273618 A1 | 1/2018 |
| WO | 2016/153137 A1 | 9/2016 |
| WO | 2017/035300 A1 | 3/2017 |

OTHER PUBLICATIONS

International Search Report issued in PCT/JP2017/010985 dated May 23, 2017 (2 Pages).
(Continued)

*Primary Examiner* — Peter G Solinsky
(74) *Attorney, Agent, or Firm* — Osha Bergman Watanabe & Burton LLP

(57) ABSTRACT

A terminal is disclosed including a receiver that receives a downlink control information and a downlink shared channel that is scheduled by the downlink control information. The terminal also includes a processor that determines an allocation of the downlink shared channel in a time domain based on a first timing indicated by a first time unit and a second timing indicated by a second time unit that are obtained from information notified by the downlink control information. In other aspects, a radio communication method is also disclosed.

13 Claims, 14 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2018/0110062 | A1* | 4/2018 | Byun | H04W 72/14 |
| 2019/0058516 | A1* | 2/2019 | Yang | H04B 7/0626 |
| 2019/0230696 | A1* | 7/2019 | Kim | H04W 72/1278 |
| 2020/0413428 | A1* | 12/2020 | Liu | H04W 72/0446 |
| 2021/0014887 | A1* | 1/2021 | Lou | H04W 72/10 |
| 2021/0219328 | A1* | 7/2021 | Xiong | H04L 1/1854 |
| 2021/0298060 | A1 | 9/2021 | Marinier et al. | |

OTHER PUBLICATIONS

Written Opinion of the International Searching Authority issued in PCT/JP2017/010985 dated May 23, 2017 (5 Pages).

Ericsson; "On timing of downlink control signaling"; TSG-RAN WG1 #86bis, R1-1609631; Lisbon, Portugal, Oct. 10-14, 2016 (2 Pages).

NTT Docomo; "Initial veiws on DL control channel design"; 3GPP TSG RAN WG1 Meeting #86bis, R1-1610058 Lisbon, Portugal, Oct. 10-14, 2016 (7 Pages).

NTT Docomo, Inc.; "Data scheduling and HARQ-ACK feedback procedures for Nr"; 3GPP TSG RAN WG1 AH_NR Meeting, R1-1700625; Spokane, USA, Jan. 16-20, 2017 (6 Pages).

3GPP TS 36.300 V8.12.0; "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; stage 2 (release 8)"; Mar. 2010 (149 Pages).

3GPP TSG RAN WG1 Meeting #88; R1-1701981 "Time domain resource allocation for mini-slot" NEC; Athens, Greece; Feb. 13-17, 2017 (3 pages).

3GPP TSG RAN WG1 Meeting #85; R1-164575 "Discussion on UL Scheduling for LAA" ZTE; Nanjing, China; May 23-27, 2016 (5 pages).

Office Action issued in Japanese Application No. 2019-505656; dated Feb. 20, 2020 (6 pages).

Extended European Search Report issued in counterpart European Patent Application No. 17900620.0, dated Sep. 18, 2020 (7 pages).

Neul Limited; "pCR 45.820 Nb M2M—Link Layer: Miscellaneous Correction"; 3GPP TSG GERAN#66, GP-150505 Vilnius, Lithuania; May 25-29, 2015 (2 pages).

Office Action issued in counterpart European Patent Application No. 17900620.0, dated Aug. 4, 2021 (6 pages).

* cited by examiner

USER TERMINAL AND RADIO COMMUNICATION METHOD

TECHNICAL FIELD

The present invention relates to a user terminal and radio communication method in the next-generation mobile communication system.

BACKGROUND ART

In UMTS (Universal Mobile Telecommunications System) networks, for the purpose of higher data rates, low delay and the like, Long Term Evolution (LTE) has been specified (Non-patent Document 1). Further, for the purpose of wider bands and higher speed than LTE (also referred to as LTE Rel.8 or 9), LTE-A (LTE-Advanced, also referred to as LTE Rel.10, 11 or 12) has been specified, and successor systems (e.g., also referred to as FRA (Future Radio Access), 5G (5th Generation mobile communication system), NR (New Radio), NX (New radio access), FX (Future generation radio access), LTE Rel.13, 14 or 15 onward and the like) to LTE have been studied.

In LTE Rel.10/11, in order to widen the band, introduced is Carrier Aggregation (CA) for aggregating a plurality of component carriers (CC: Component Carrier). Each CC is configured with a system band of LTE Rel.8 as one unit. Further, in CA, a plurality of CCs of the same radio base station (eNB: eNodeB) is set on a user terminal (UE: User Equipment).

On the other hand, in LTE Rel.12, Dual Connectivity (DC) is also introduced where a plurality of cell groups (CG: Cell Group) of different radio base stations is set on UE. Each cell group is comprised of at least a single cell (CC). In DC, since a plurality of CCs of different radio base stations is aggregated, DC is also called inter-base station CA (Inter-eNB CA) and the like.

Further, in the existing LTE system (e.g., LTE Rel.8-13), a user terminal receives downlink control information (DCI) via a downlink (DL) control channel (e.g., PDCCH: Physical Downlink Control Channel, EPDCCH: Enhanced Physical Downlink Control channel, MPDCCH: MTC (Machine type communication) Physical Downlink Control Channel, etc.). Based on the DCI, the user terminal performs reception of a DL data channel (e.g., PDSCH: Physical Downlink Shared Channel) and/or transmission of a UL data channel (e.g., PUSCH: Physical Uplink Shared Channel) at predetermined timing.

CITATION LIST

Non-Patent Literature

[Non-patent Literature 1] 3GPP TS 36.300 V.8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

In future radio communication systems (e.g., 5G, NR), in order to actualize high speed and high capacity (e.g., MBB: enhanced Mobile Broad Band), it is studied to use frequency bands (e.g., 3~40 GHz) higher than the existing frequency band. Generally, as the frequency band is higher, distance attenuation increases, and it is thereby difficult to secure coverage. Therefore, studied is MINO (also referred to as Multiple Input Multiple Output, Massive MIMO and the like) using many antenna elements.

In MIMO using many antenna elements, it is possible to form beams (antenna directivity) (BF: Beam Forming), by controlling amplitude and/or phase of a signal transmitted or received in each antenna element. For example, in the case where antenna elements are arranged two-dimensionally, as the frequency is higher, increases the number of antenna elements capable of being arranged in a predetermined area. As the number of antenna elements per predetermined area is higher, the beam width is narrower, and beam forming gain thereby increases. Accordingly, in the case of applying beam forming, it is possible to reduce path loss, and also in high frequency bands, it is possible to secure coverage.

On the other hand, in the case of applying beam forming, there is the risk that deterioration of the beam and/or interruption of link (beam failure) occurs by blockage by an obstruction or the like, and that the communication quality deteriorates.

Therefore, it is studied to ensure robustness of a DL control channel, by transmitting the DL control channel (also referred to as NR-PDCCH, etc.) using a plurality of different time regions and/or frequency regions (one or more beams). However, in the case of transmitting the DL control channel using a plurality of different time regions and/or frequency regions (one or more beams), there is the risk that a user terminal is not capable of properly grasping scheduling timing of data scheduled in the DL control channel (DCI).

The present invention was made in view of such a respect, and it is an object of the invention to provide a user terminal and radio communication method capable of properly grasping scheduling timing of data scheduled in the DL control channel (DCI).

Means for Solving the Problem

A user terminal according to one aspect of the present invention is characterized by having a receiving section that monitors downlink control channels transmitted in a plurality of different time regions and/or frequency regions to receive downlink control information (DCI), and a control section that controls reception and/or transmission of data scheduled by the DCI, where the control section controls reception timing and/or transmission timing of the data, based on at least timing information included in the DCI.

Advantageous Effect of the Invention

According to the present invention, it is possible to properly grasp scheduling information of data scheduled in the DL control channel (DCI).

DESCRIPTION OF EMBODIMENTS

Figure 1:
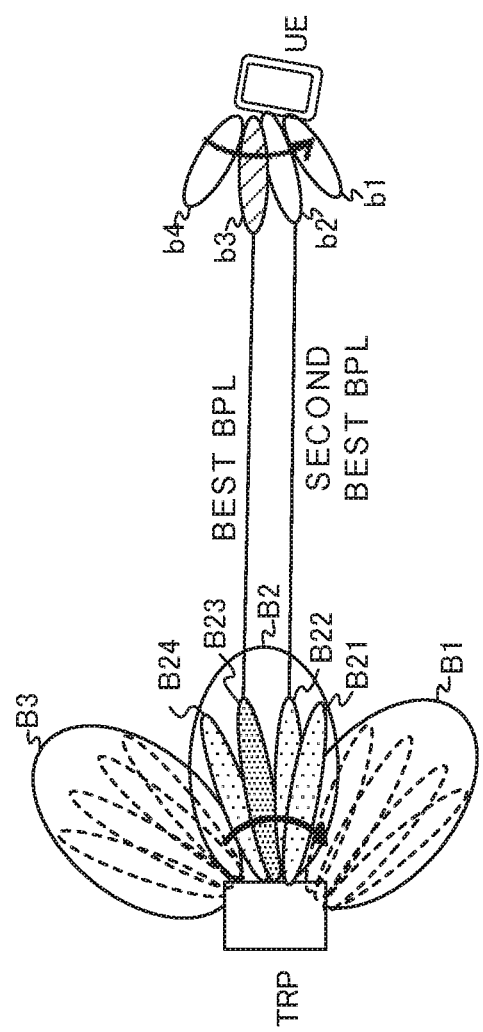
FIG. 1 is a diagram showing one example of BPL.

In future radio communication systems (e.g., 5G, NR), use cases are expected such as high speed and high capacity (e.g., eMBB), ultra-high-number-of terminals (e.g., massive MTC (Machine Type Communication)), and ultra-high reliability and low delay (e.g., URLLC (Ultra Reliable and Low Latency communications). By expecting these use cases, for example, in the future radio communication system, it is studied to perform communication using beam forming (BF).

Beam Forming (BF) includes digital BF and analog beam BF. The digital BF is a method of performing precoding signal processing (on a digital signal) on baseband. In this case, parallel processing of Inverse Fast Fourier Transform (IFFT), Digital to Analog Converter (DAC) and RF (Radio Frequency) is required corresponding to the number of antenna ports (RF chains). On the other hand, at any timing, it is possible to form the number of beams corresponding to the number of RF chains.

The analog BF is a method using a phase shift device on RF. In this case, since the phase of an RF signal is only rotated, the configuration is easy and is capable of being actualized at low cost, but it is not possible to form a plurality of beams at the same timing. Specifically, in the analog BF, only one beam is formed at a time for each phase shift device.

Therefore, when a radio base station (e.g., called gNB (gNodeB), Transmission and Reception Point (TRP), eNB (eNodeB), Base Station (BS), etc.) has only one phase shift device, only one beam is capable of being formed at a certain time. Accordingly, in the case of transmitting a plurality of beams using only analog BF, since it is not possible to transmit concurrently in the same resource, it is necessary to switch or rotate the beam temporally.

In addition, it is also possible to make a hybrid BF configuration with digital BF and analog BF combined. In the future radio communication system (e.g., 5G, NR), it is studied to introduce MIMO (e.g., Massive MIMO) using many antenna elements, but when beam forming with the enormous number of beams is performed only by digital BF, there is the risk that the circuit configuration is expensive.

Therefore, in the future radio communication system, it is also expected to use hybrid BF.

In the case of applying BF (including digital BF, analog BF and hybrid BF) as described above, there is the risk of occurrences of deterioration of beam quality (e.g., received power (e.g., RSSI: Received Signal Strength Indicator and/or RSRP: Reference Signal Received Power and the like) and/or received quality (e.g., at least one of Signal to Noise Ratio (SNR), Signal-to-Interference plus Noise power Ratio (SINR) and RSRQ (Reference Signal Received Quality) and the like) and/or interruption of link (beam failure) caused by blockage by an obstruction and the like. Particularly, in the case of using a narrower beam in a high-frequency band, the risk is high that the communication quality deteriorates by significantly undergoing effects of the obstruction and the like.

Accordingly, in order to ensure robustness of beam, it is also studied to transmit a plurality of DL control channels (also called NR-PDCCH) for scheduling the same data using a plurality of beams, using different time resources and/or frequency resources. A user terminal monitors NR-PDCCHs transmitted using a plurality of beams, in different time resources and/or frequency resources.

A plurality of beams to apply to the NR-PDCCH may be a plurality of transmission beams or reception beams, or may be a plurality of beam pair links (BPL). The beam pair link (BPL) corresponds to a combination of a beam (also referred to as transmission beam, Tx beam, etc.) used in transmission (e.g., base station side) of a signal and a beam (also referred to as reception beam, Rx beam, etc.) used in reception (e.g., UE side) of the signal. The BPL may be determined by a user terminal using a DL signal (e.g., reference signal) transmitted from a radio base station, or may be determined by the radio base station based on a measurement report and the like from the user terminal.

FIG. 1 is a diagram showing one example of BPL. For example, in FIG. 1, a radio base station transmits a signal (mobility measurement signal) for mobility measurement using one or more beams (herein, B1 to B3). In FIG. 1, a user terminal measures received power (e.g., RSSI and/or RSRP) and/or received quality (e.g., at least one of RSRQ, SNR and SINR or the like) of mobility measurement signals associated with beams B1 to B3. The user terminal transmits a measurement report (MR) indicative of identifiers (also referred to as beam ID, beam index (BI), etc.) and/or measurement results of one or more beams to the radio base station. Alternatively, the user terminal may transmit a measurement report (MR) indicative of one or more beam pair link identifiers (also referred to as beam pair link ID, BPLI, BPLID, etc.) and/or measurement results to the radio base station.

Based on the measurement report, the radio base station determines Tx beams B21 to B24 used in data communication or control signal communication with the user terminal. The user terminal measures CSI-RS resources #1 to #4 respectively associated with the Tx beams B21 to B24 or BPL comprised of each Tx beam and corresponding Rx beam, and generates one or more CSI reports. In FIG. 1, based on the measurement result, the user terminal may select the predetermined number of Tx beams or BPLs, and report CSI on the Tx beams or BPLs to the radio base station. Further, the user terminal may determine an Rx beam to apply to each selected Tx beam, and determine the beam pair link (BPL). Furthermore, the user terminal may report determined one or more BPLs to the radio base station.

FIG. 1 illustrates the case where Tx beam B23 and Rx beam b3 are selected as the best BPL, and Tx beam B22 and Rx beam b2 are selected as the second best BPL. In addition, based on the report from the user terminal, the radio base station may select a predetermined BPL, and notify the user terminal of the predetermined BPL using higher layer signaling and MAC signaling. Further, the BPL and radio resources (predetermined frequency resources and/or time resources) may be set in association therewith, and in this case, the information for associating the BPL with radio resources may be notified to (set on) the user terminal from the radio base station.

The radio base station may transmit NR-PDCCHs, using M (M≥1) Tx beams (or BPLs) determined based on the CSI from the user terminal. The user terminal may monitor (perform blind decoding) the NR-PDCCH, using at least one of M BPLs. The user terminal may monitor NR-PDCCHs in all of M BPLs, or may monitor NR-PDCCHs in a part of M BPLs. The maximum value of M may be determined based on the capability of the user terminal.

The user terminal may monitor the NR-PDCCH transmitted by one or more beams (BPLs or Tx beams) transmitted in one or more time resources and/or frequency resources. Further, the user terminal may monitor the NR-PDCCH of some beam for a period shorter than in another beam. Furthermore, monitoring of the NR-PDCCH over a plurality of time resources may be applied in the case where the user terminal does not have a plurality of RF chains (antenna ports).

In addition, a unit of the time resource corresponding to a different beam may be one or more slots (or mini-slots), or may be one or more symbols. Further, a unit of the frequency resource corresponding to a different beam may be one or more resource blocks (RBs), one or more resource element groups (REGs), one or more REG groups, one or more control channel elements (CCEs) or the like. Herein, the REG group is comprised of a plurality of REGs. The REG is comprised of a plurality of resource elements (REs). The RE is comprised of one symbol and one subcarrier.

Thus, by transmitting a plurality of NR-PDCCHs for scheduling predetermined data using different beams (for example, BPLs), even in the case where some beam deteriorates, the user terminal is capable of receiving the NR-PDCCH corresponding to another beam. By transmitting NR-PDCCHs using a plurality of beams, it is possible to suppress deterioration of the communication quality caused by blockage by an obstruction.

In addition, in the existing LTE system, when a user terminal receives a DL control channel (DCI) for scheduling data, the user terminal performs transmission and reception of data predetermined timing later. For example, in the case of receiving DCI (also called UL grant) for indicating UL transmission, the user terminal performs UL transmission predetermined timing later (e.g., 4 ms later). Further, in the case of receiving DCI (also referred to as DL grant or DL assignment) for indicating DL transmission, the user terminal performs DL reception in the same subframe. Thus, in the existing LTE system, in the case of receiving the DL control channel, transmission and reception is controlled at beforehand specified scheduling timing.

On the other hand, in the case where a plurality of NR-PDCCHs (DCI) is transmitted as described above, it is a problem how to control reception timing and/or transmission timing of data. Particularly, in the case where the user terminal detects a plurality of NR-PDCCHs for scheduling the same data in different time resources, in the existing method, there is the risk that the terminal is not capable of properly grasping scheduling timing of the data.

Then, in the case of monitoring a plurality of NR-PDCCHs (DCI) transmitted using different beams, the inventors of the present invention found out that at least information indicative of scheduling timing of data is included in detected DCI, instead of scheduling data beforehand specified timing later after detection of the DCI. By this configuration, even in the case where NR-PDCCHs (DCI) for scheduling data of the same time resource is transmitted in different time resources, the user terminal is capable of properly grasping scheduling timing of the data based on the information notified by the DCI.

This Embodiment will be described below in detail with reference to drawings. In addition, as beam forming in this Embodiment, digital BF is assumed, but it is possible to also apply to analog BF and hybrid BF as appropriate. Further, in this Embodiment, a "beam" may include a beam (also referred to as transmission beam, Tx beam, etc.) used in transmission of a DL signal from a radio base station and/or a beam (also referred to as reception beam, Rx beam, etc.) used in reception of a DL signal in a user terminal. Alternatively, the beam may include a beam (also referred to as transmission beam, Tx beam, etc.) used in transmission of a UL signal from a user terminal and/or a beam (also referred to as reception beam, Rx beam, etc.) used in reception of a UL signal in a radio base station. A combination of the Tx beam and Rx beam may be called a beam pair link (BPL) and the like.

(Aspect 1)

In Aspect 1, a transmission method will be described in the case of transmitting an NR-PDCCH using a predetermined beam in different time resources and/or frequency resources.

A single NR-PDCCH may be transmitted and received in a plurality of time resources and/or frequency resources associated with a single beam, or transmission and reception may be controlled in a plurality of time resources and/or frequency resources respectively associated with a plurality of beams.

In the case where a single NR-PDCCH is transmitted and received in a plurality of time resources and/or frequency resources respectively associated with a plurality of beams, the NR-PDCCH may be divided to assign to a plurality of time resources and/or frequency resources. Alternatively, the NR-PDCCH may be replicated (the same NR-PDCCH is generated repeatedly) to assign to a plurality of time resources and/or frequency resources. Referring to FIGS. 2 and 3, the NR-PDCCH transmission and reception of which is performed with a plurality of beams will be described in detail. In addition, FIGS. 2 and 3 only show the Tx beam, and an Rx beam (or BPL) that corresponds to the Tx beam may be used.

Figure 2A:
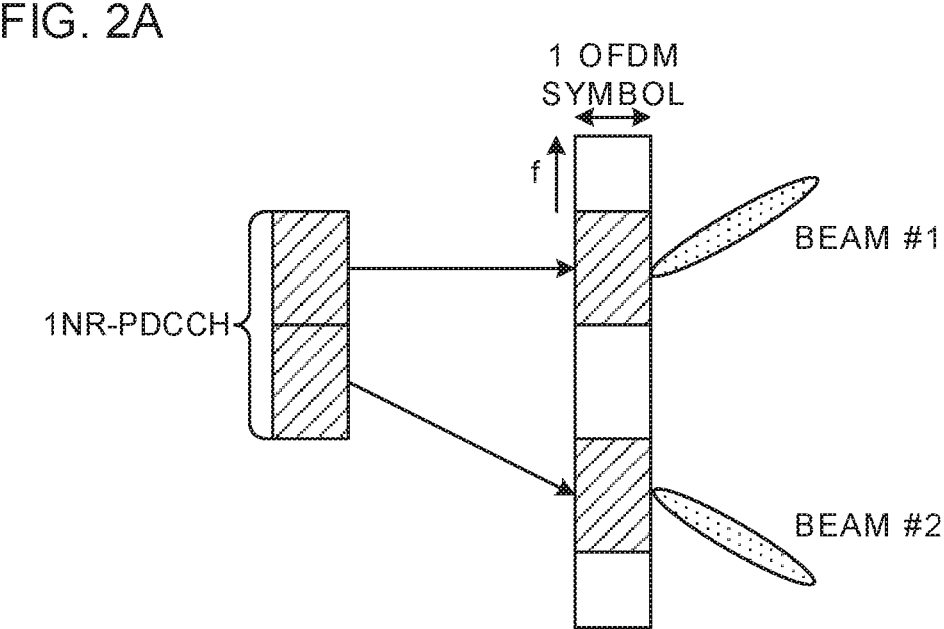
FIGS. 2A and 2B are diagrams showing one example of monitoring of NR-PDCCH.
Figure 2B:
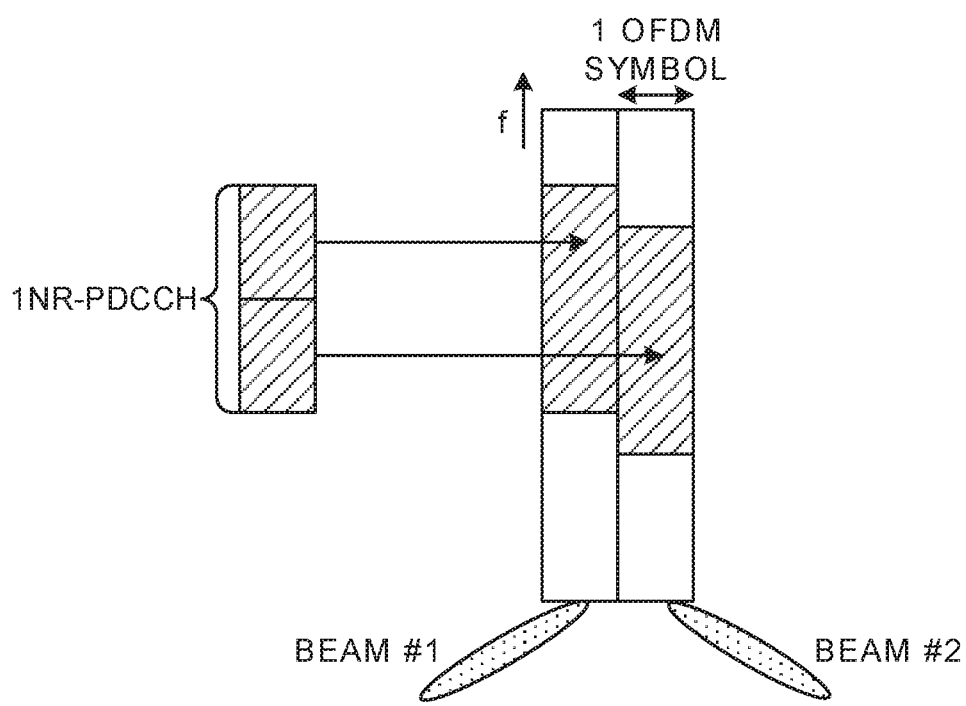

In FIG. 2, a single NR-PDCCH is comprised of (divided into) a plurality of items of coded data, and the plurality of items of coded data is transmitted using a plurality of different beams. For example, FIGS. 2A and 2B show an example where a single NR-PDCCH corresponds to a plurality of items of coded data (herein, two items of coded data).

In FIG. 2A, two items of coded data are mapped to different frequency resources of the same symbol (OFDM symbol), and are transmitted respectively using different beams #1 and #2. On the other hand, in FIG. 2B, two items of coded data are mapped to frequency resources of different symbols, and are transmitted respectively using different beams #1 and #2.

As shown in FIGS. 2A and 2B, in the case where a single NR-PDCCH is monitored with M beams, when the coding rate of the NR-PDCCH is 1/M or less, in theory, a user terminal is capable of restoring the NR-PDCCH by detection of one of M beams.

Figure 3A:
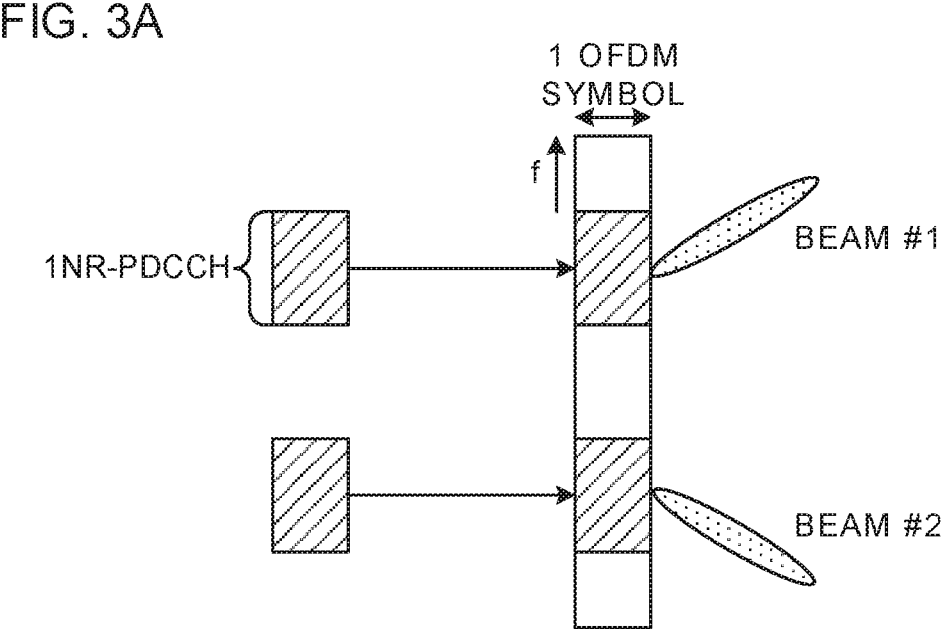
FIGS. 3A and 3B are diagrams showing another example of monitoring of NR-PDCCH.
Figure 3B:
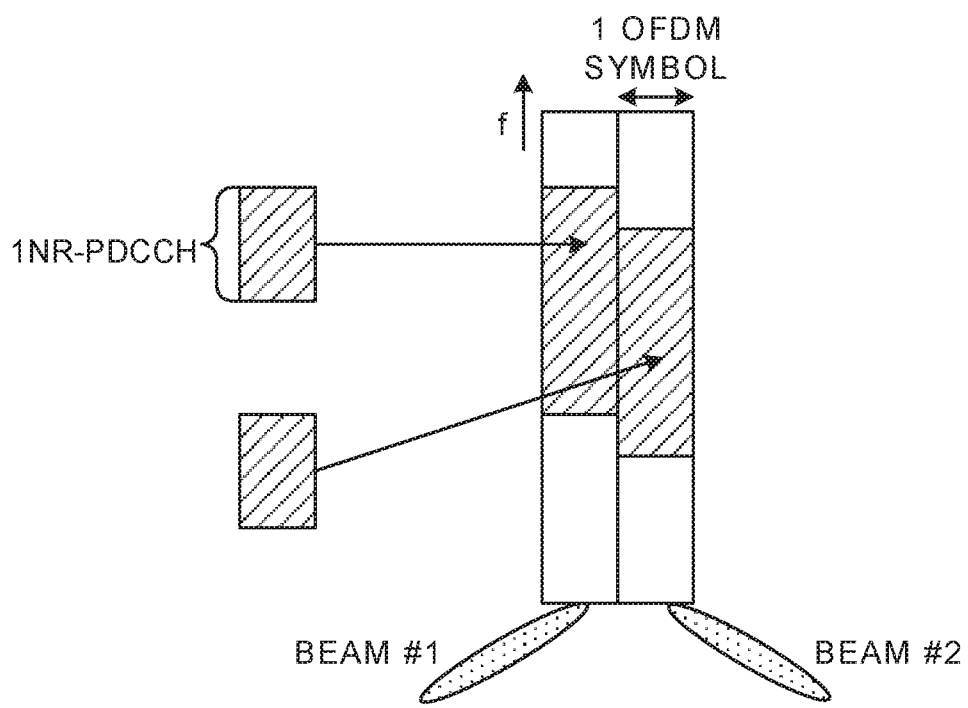

FIG. 3 is a diagram showing another example of NR-PDCCH transmitted (base station side) and monitored (UE side) with a plurality of beams. In FIG. 3, the same NR-PDCCH is repeated (replicated), and a plurality of replicated NR-PDCCHs is transmitted respectively using a plurality of different beams. In repetition, DCI prior to error correcting coding (subsequent to addition of CRC) may be replicated, error correcting coding—rate matching—data modulation may be performed on each DCI, and the NR-PDCCH may be generated using each DCI, and then, transmitted using a different beam. Alternatively, the NR-PDCCH generated by performing error correcting coding—rate matching—data modulation may be replicated, and each NR-PDCCH may be transmitted using a different beam. For example, FIGS. 3A and 3B show the example where the same NR-PDCCH is repeated a plurality of times (herein, twice).

In FIG. 3A, two NR-PDCCHs with the same description are mapped to different frequency resources of the same symbol, and are transmitted using different beams #1 and #2, respectively. On the other hand, in FIG. 3B, the two NR-PDCCHs are mapped to frequency resources of different symbols, and are transmitted using different beams #1 and #2, respectively.

As shown in FIGS. 3A and 3, in the case where a plurality of repeated NR-PDCCHs is monitored with M beams, the plurality of NR-PDCCHs may be disposed in different candidate resources (also referred to as NR-PDCCH candidates, etc.) of the same search space, or may be disposed in candidate resources within different search space.

As shown in FIGS. 3A and 3B, in the case where a plurality of repeated NR-PDCCHs is monitored with M beams, a user terminal is capable of restoring the NR-PDCCH by detection of one of M beams. In the case of detecting a plurality of beams, a user terminal may synthesize a plurality of NR-PDCCHs.

In addition, it is also possible to transmit a plurality of repeated NR-PDCCHs with the same beam. In the case where a plurality of repeated NR-PDCCHs is transmitted with the same beam, it is possible to improve channel estimation accuracy, by performing averaging/filtering on channel estimation values obtained by using respective RSs that correspond to a plurality of NR-PDCCHs. Alternatively, in the case where a plurality of repeated NR-PDCCHs is transmitted with the same beam, an RS may be transmitted which corresponds to only one or a part of the plurality of NR-PDCCHs. In this case, it is possible to reduce RS overhead and improve performance. In the case where a plurality of repeated NR-PDCCHs is transmitted with different beams, it is desired to perform channel estimation and demodulation independently, using an RS that corresponds to each of the beams.

A user terminal may be set for information indicating whether or not the terminal is capable of performing averaging/filtering on channel estimation values obtained by respective RSs that correspond to a plurality of repeated NR-PDCCHs, by higher layer signaling. Alternatively, irrespective of whether a plurality of repeated NR-PDCCHs is transmitted with the same beam or different beams, a user terminal may perform channel estimation independently, without performing averaging/filtering on channel estimation values obtained by respective RSs that correspond to the plurality of repeated NR-PDCCHs. As described above, with respect to the information indicating whether transmission beams that correspond to a plurality of repeated NR-PDCCHs are the same or different, or information indicative of a difference in the case of different beams, it is possible to properly control such information, without the user terminal always identifying.

Further, in the case where NR-PDCCHs are transmitted using a plurality of beams, a user terminal performs demodulation of each NR-PDCCH using a predetermined demodulation reference signal for each beam. At this point, channel estimation may be performed, without averaging in different beams. By performing channel estimation for each beam, it is possible to correctly grasp a channel state for each beam.

(Aspect 2)

Aspect 2 describes the case of controlling reception of DL data and/or transmission of UL data, using timing information included in downlink control information (DCI) transmitted on a DL control channel (e.g., NR-PDCCH) and predetermined reference timing.

Using timing information included in DCI transmitted on a detected NR-PDCCH and beforehand set predetermined reference timing, a user terminal recognizes reception timing and/or transmission timing of data scheduled by the DCI. The timing information included in DCI may be an offset value from the beforehand set reference timing. The offset value may be a configurable value, or may be a fixed valued.

Further, a user terminal may be notified of a predetermined offset value, by beforehand associating candidates for a plurality of offset values with a plurality of pieces of bit information to set (for example, define a table), and notifying of predetermined bit information using DCI. Further, the candidates for a plurality of offset values may be defined as fixed values, or may be set as appropriate using higher layer signaling and the like.

The offset value is specified using a predetermined time unit (e.g., scheduling unit). For example, the offset value is specified using the number of OFDM symbols, or the number of sets of OFDM symbols. The set of OFDM symbols is comprised of a combination of a plurality of OFDM symbols. Alternatively, the offset value may be specified using the number of mini-slots, or the number of sets of mini-slots. The set of mini-slots is comprised of a combination of a plurality of mini-slots. Alternatively, the offset value may be specified using the number of slots, or the number of sets of slots. The set of slots is comprised of a combination of a plurality of slots.

Further, the offset value may be defined by combining at least two of a plurality of scheduling units (OFDM symbol, mini-slot, slot and the like). Furthermore, with respect to scheduling of DL data and scheduling of UL data, the offset value may be specified using different scheduling units. For example, the offset value included in DCI for scheduling DL data may be specified using the symbol and/or mini-slot, and the offset value included in DCI for scheduling UL data may be specified using the slot. As a matter of course, the present invention is not limited thereto.

The reference timing is beforehand set on a user terminal, and is the reference in applying an offset value notified by DCI. The reference timing may be set fixedly by specifications and the like, or may set on a user terminal by a radio base station, using higher layer signaling (e.g., RRC signaling, broadcast information) and the like. As one example, the beginning of a predetermined scheduling unit (e.g., slot) may be defined as the reference timing. As a matter of course, the time unit and position set for the reference timing are not limited thereto.

The reference timing is set commonly in the case where the NR-PDCCH (DCI) is transmitted in any of time resources (for example, symbol). Therefore, also in the case where a plurality of pieces of DCI (for example, NR-PDCCHs that correspond to different BPLs) for scheduling the same data is transmitted in different time resources, the offset value included in each DCI is the same.

A user terminal may control reception timing and/or transmission timing of data, by assuming that the same offset value is included in a plurality of NR-PDCCHs (DCI) for scheduling the same data. For example, different beams (e.g., BPLs) are applied to NR-PDCCHs for scheduling the same data, and the NR-PDCCHs are transmitted in different frequency resources and/or time resources. The user terminal monitors the NR-PDCCHs (which may be called NR-PDCCH candidates or search space) with different beams applied, and receives the DCI. NR-PDCCHs that the user terminal monitors may be beforehand set from the radio base station.

FIG. 4 illustrates the case of controlling reception of DL data based on the offset value notified by DCI and the reference timing. FIG. 4 illustrates the case of setting the reference timing on the beginning of a slot. In addition, the reference timing is not limited to the beginning of a slot. Further, FIG. 4 illustrates the case of controlling reception of DL data, and transmission of UL data may be also controlled based on the offset value notified by DCI and the reference timing.

FIG. 4 illustrates the case where transmission of DCI and DL data is performed in a slot comprised of 14 OFDM symbols (#0-#13). The case is shown where the slot is comprised of 6 mini-slots (#0-#5), and each mini-slot is comprised of 3, 2, 2, 2, 2 or 3 symbols in the time domain. The applicable slot configuration and mini-slot configuration are not limited thereto. For example, in the time domain, mini-slots may be configured with 2, 2, 2, 2, 2, 2 and 2 symbols inside the slot, or may be configured with 2, 3, 2, 2, 2 and 3 symbols, and the number of symbols per mini-slot may be comprised of the further different number of symbols. One mini-slot may be disposed over two symbols.

Figure 4A:
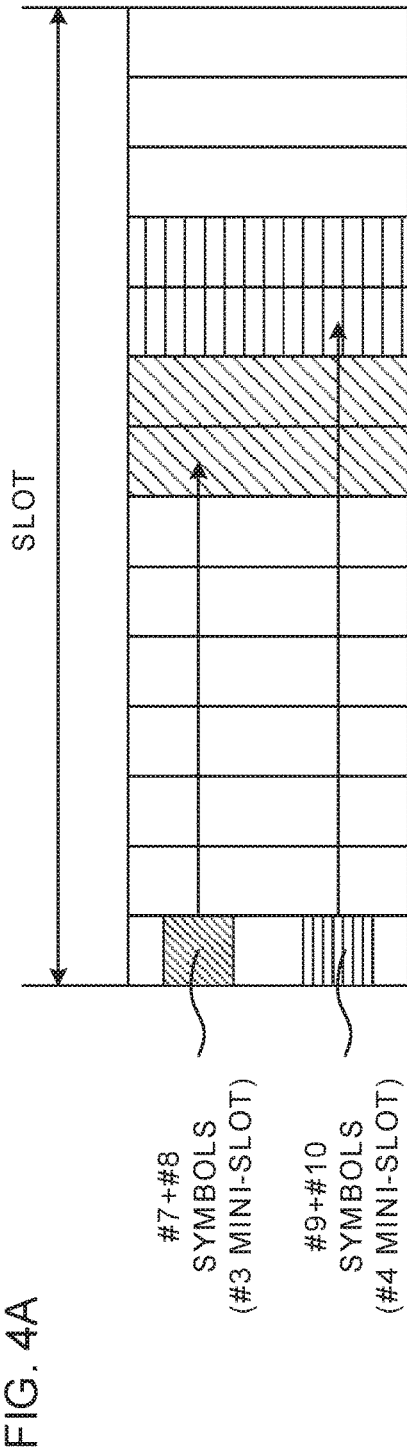
FIGS. 4A and 4B are diagrams showing one example of a method of controlling scheduling timing of data.

FIG. 4A illustrates the case where data #1 is assigned to mini-slot #3 (or symbols #7, #8), and data #2 is assigned to mini-slot #4 (or symbols #9, #10). Each data is scheduled in one or a plurality of NR-PDCCHs (DCI). Herein, the case is shown where DCI #1 for scheduling data #1 and DCI #2 for scheduling data #2 is transmitted in the same time resource (herein, symbol #0).

The offset value included in each DCI is determined from the reference timing and an assignment schedule position of data. In FIG. 4A, since the reference timing is the beginning of the slot, the offset between the reference timing and data #1 is 7-symbol+8-symbol (or, 3 mini-slots). Similarly, the offset between the reference timing and data #2 is 9-symbol+10-symbol (or, 4 mini-slots).

The radio base station includes the offset value corresponding to 7-symbol+8-symbol (or, 3 mini-slots) in DCI #1 for scheduling data #1 to transmit. Further, the radio base station includes the offset value corresponding to 9-symbol+10-symbol (or, 4 mini-slots) in DCI #2 for scheduling data #2 to transmit.

In the case where data is assigned to a plurality of scheduling units (for example, a plurality of symbols and/or a plurality of min-slots and the like), all of a period during which the data is assigned may be included in the offset value to notify, or only a part (for example, data assignment start position and/or end position) may be included in the offset value to notify. Based on the offset values included in DCI #1 and DCI #2 and the reference timing, the user terminal is capable of recognizing reception timing of data #1 and data #2, respectively.

Figure 4B:
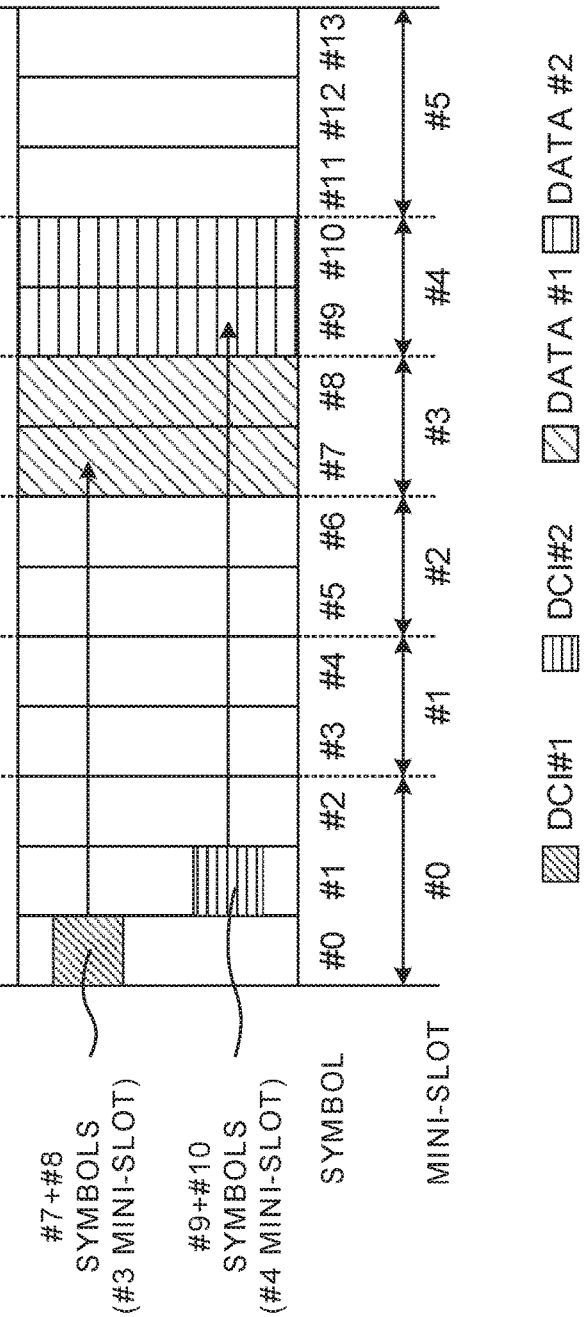

FIG. 4B illustrates the case where DCI #2 for scheduling data #2 is transmitted in the time resource (herein, symbol #1) different from that of DCI #1. In other words, in FIG. 4B, the time resource for transmitting DCI #2 is changed as compared with FIG. 4A.

In addition, since the scheduling timing of data #2 is determined based on the reference timing, the offset value included in DCI #2 is the same value as that of DCI #2 in FIG. 4A. Thus, by controlling scheduling timing of data based on the reference timing, irrespective of timing (time resource) at which DCI is transmitted, it is possible to make the offset value the same. In the case where a user terminal detects at least one NR-PDCCH, the terminal may halt detection of the NR-PDCCH of another beam.

Figure 5:
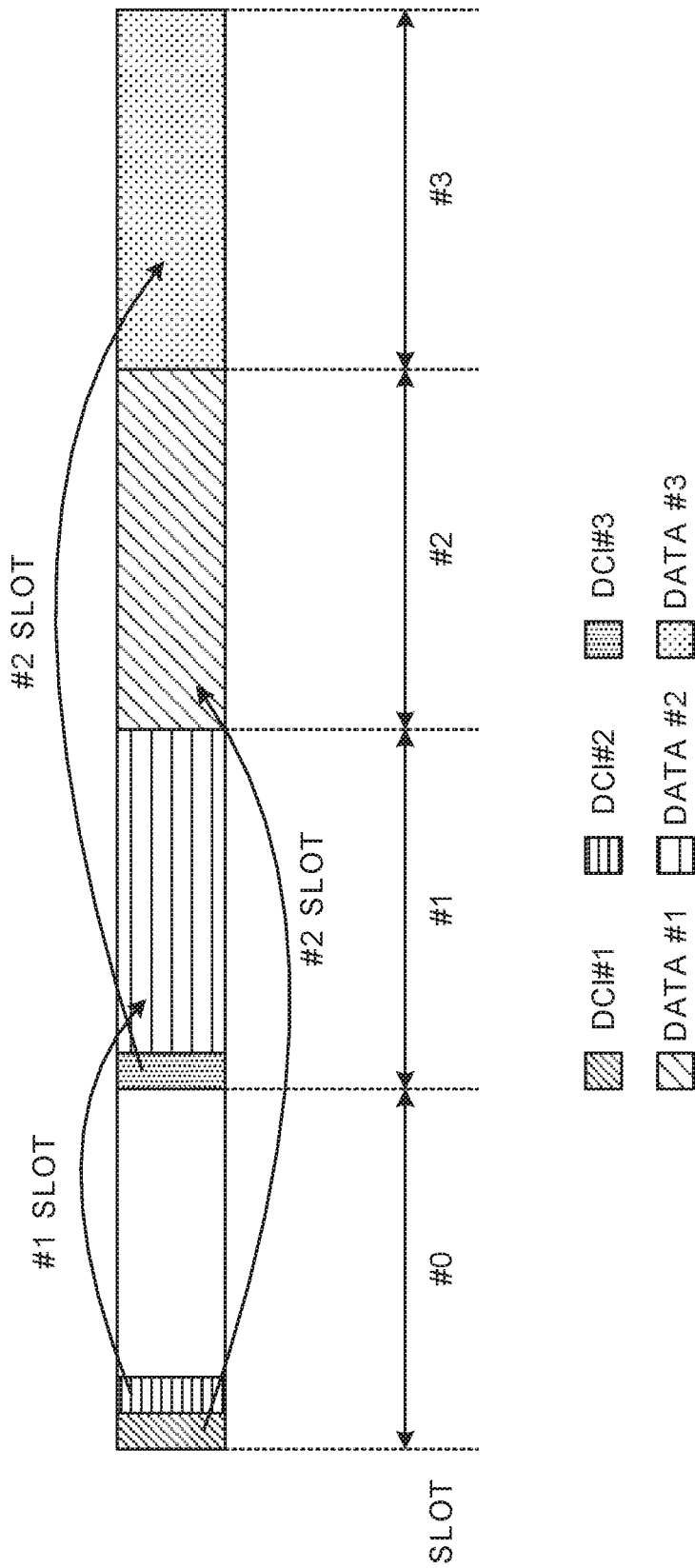
FIG. 5 is a diagram showing another example of the method of controlling scheduling timing of data.

FIG. 5 illustrates the case of performing scheduling of data in a slot unit. In this case, an offset value included in DCI is specified at least in a slot unit. FIG. 5 illustrates the case (cross-slot scheduling) where data #2, #1 and #3 is respectively assigned to slots #1, #2 and #3, and data #1 to #3 is scheduled in DCI #1, #2 and #3 transmitted in different slots, respectively.

In FIG. 5, DCI #1 transmitted in slot #0 schedules data #1 assigned to slot #2. In the case where the reference timing is set on the beginning of the slot (herein, #0) in which the DCI (NR-PDCCH) is detected, the offset value included in DCI #1 is "2".

Further, DCI #2 transmitted in slot #0 schedules data #2 assigned to slot #1. Therefore, the offset value included in DCI #2 is "1". Furthermore, DCI #3 transmitted in slot #1 schedules data #3 assigned to slot #3. Therefore, the offset value included in DCI #3 is "2".

In addition, FIG. 5 illustrates the case (cross-slot scheduling) of controlling scheduling of data using DCI transmitted in different slots, and DCI and data may be disposed in the same slot. In this case, the offset value included in the DCI is set at "0". Further, FIG. 5 illustrates the case of notifying of the offset value in a slot unit, and in addition to the slot, information in a symbol and/or mini-slot unit may be included in the offset value to notify. By this means, in the case where cross-slot scheduling is performed, it is possible to control assignment of data also in a symbol and/or mini-slot unit.

Figure 6:
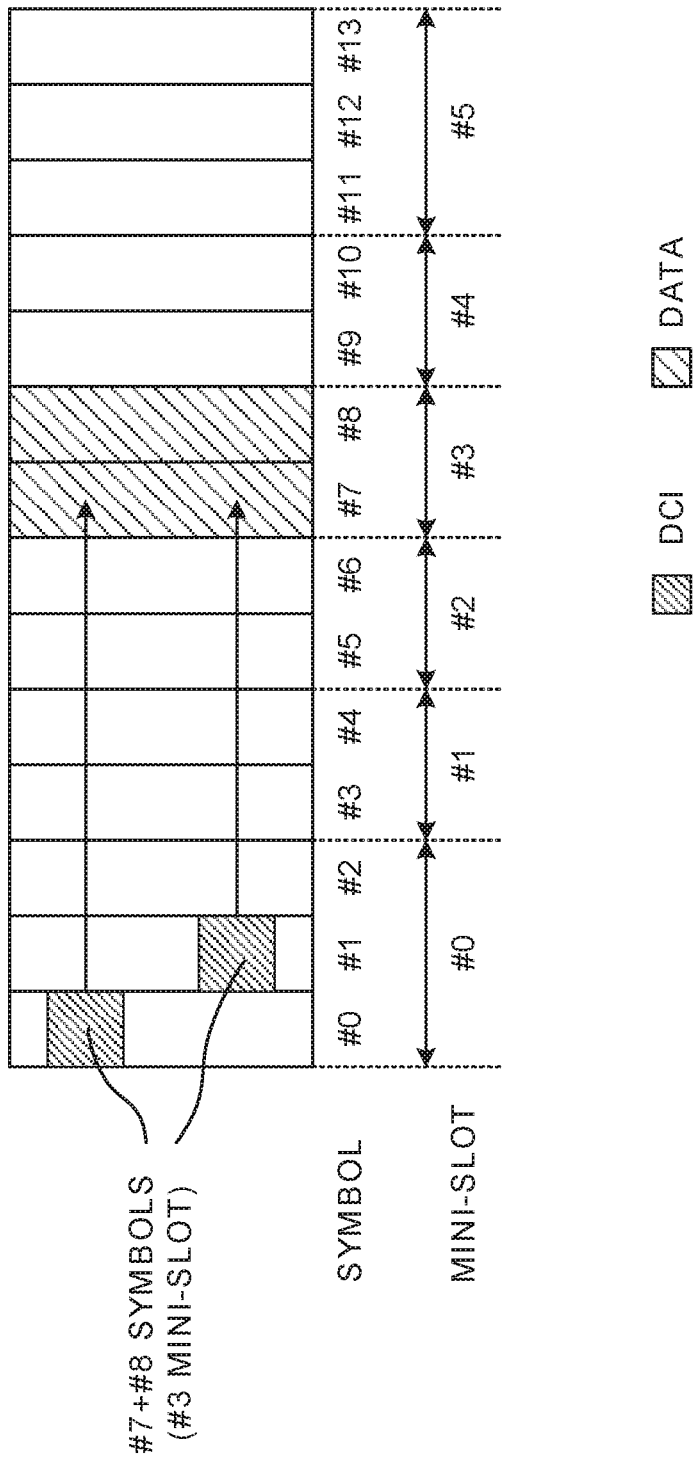
FIG. 6 is a diagram showing still another example of the method of controlling scheduling timing of data.

FIG. 6 illustrates the case where a plurality of NR-PDCCHs (DCI) for scheduling data (for example, the same data) of the same time resource is assigned to different time resources. FIG. 6 illustrates the case where the NR-PDCCH for scheduling data transmitted in symbols #7 and #8 (mini-slot #3) is transmitted in each of symbol #0 and symbol #1. The same or different beam (for example, BPL) is applied to the NR-PDCCH transmitted in each of symbol #0 and symbol #1.

Also in FIG. 6, scheduling timing of the data is controlled based on the reference timing (for example, the beginning of a slot). Therefore, the offset value included in the DCI transmitted in each of symbol #0 and symbol #1 is the same as each other. In the case where the reference timing is set at the beginning of the slot, each DCI includes the offset value corresponding to 7-symbol+8-symbol (or 3 mini-slots). The user terminal controls reception timing and/or transmission timing of the data, using the offset value notified by at least one DCI and the reference timing.

In the case where the user terminal detects at least one NR-PDCCH, the terminal may halt detection of the NR-PDCCH of another beam. By such operation, it is possible to decrease processing loads on the user terminal. Alternatively, in the case where the user terminal receives a plurality of NR-PDCCHs (DCI), the terminal may combine a plurality of pieces of DCI to control reception and/or transmission of data.

Alternatively, the user terminal may control reception and/or transmission of data based on the first detected NR-PDCCH (DCI), or may control reception and/or transmission of data based on the last detected NR-PDCCH (DCI). In this case, when the user terminal receives a plurality of pieces of DCI for scheduling the same data, based on the predetermined DCI, the terminal determines at least one of scheduling timing, parameter used in reception processing and parameter (resources used in UL transmission, coding rate, etc.) used in transmission processing.
(Aspect 3)

Aspect 3 describes the case of controlling reception of DL data and/or transmission of UL data, using timing information included in DCI transmitted on a DL control channel (e.g., NR-PDCCH) and reception timing of the DCI.

Using timing information included in the detected NR-PDCCH (DCI) and detection timing of the NR-PDCCH, a user terminal controls reception timing and/or transmission timing of data scheduled by the DCI. The timing information included in the DCI may be an offset value from detection timing of the NR-PDCCH. The offset value notified by the DCI may be a configurable value, or may be a fixed valued.

Further, a user terminal may be notified of a predetermined offset value, by beforehand associating candidates for a plurality of offset values with a plurality of pieces of bit information (for example, define a table), and notifying of predetermined bit information using DCI. Further, the candidates for a plurality of offset values may be defined as fixed values, or may be set as appropriate using higher layer signaling and the like.

The offset value is specified using a predetermined time unit (e.g., scheduling unit). For example, the offset value is specified using the number of OFDM symbols, or the number of sets of OFDM symbols. Alternatively, the offset value may be specified using the number of mini-slots, or the number of sets of mini-slots. Alternatively, the offset value may be specified using the number of slots, or the number of sets of slots.

Further, the offset value may be defined by combining at least two of a plurality of scheduling units (OFDM symbol, mini-slot, slot and the like). Furthermore, with respect to scheduling of DL data and scheduling of UL data, the offset value may be specified using different scheduling units. For example, the offset value included in DCI for scheduling DL data may be specified using the symbol and/or mini-slot, and the offset value included in DCI for scheduling UL data may be specified using the slot. As a matter of course, the present invention is not limited thereto.

In the case of transmitting a plurality of NR-PDCCHs (DCI) for scheduling data of the same time resource, the offset value included in each DCI is set, corresponding to timing at which each DCI is transmitted. Therefore, in the case where a plurality of pieces of DCI for scheduling the same data is transmitted in different time resources, the offset value included in each DCI is a different value.

Figure 7:
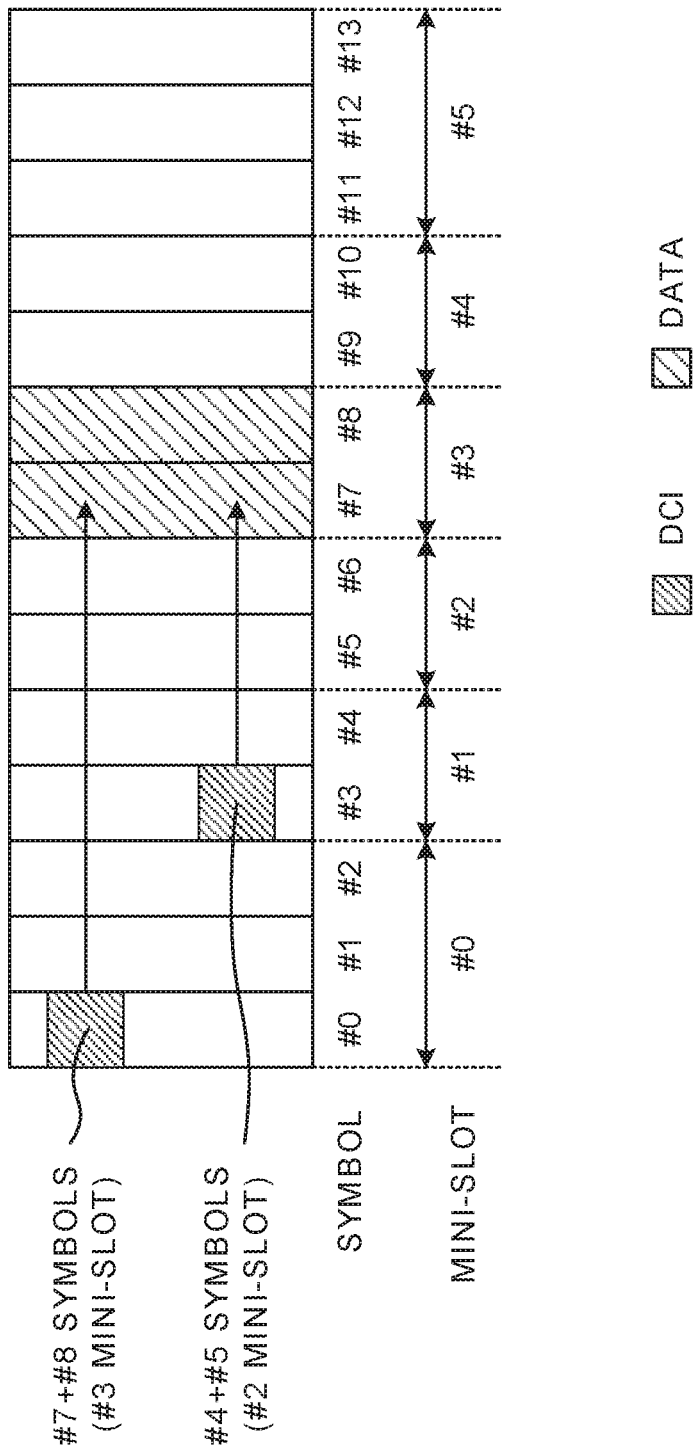
FIG. 7 is a diagram showing still another example of the method of controlling scheduling timing of data.

FIG. 7 illustrates the case where a plurality of NR-PDCCHs (DCI) for scheduling data (for example, the same data) of the same time resource is assigned to different time resources. FIG. 7 illustrates the case where NR-PDCCHs (DCI) for scheduling data transmitted in symbols #7 and #8 (mini-slot #3) are respectively transmitted in symbol #0 and symbol #3. The same or different beams (for example, BPLs) are applied to the NR-PDCCHs (DCI) respectively transmitted in symbol #0 and symbol #3.

In this case, scheduling timing of data is controlled based on detection timing of each DCI. Therefore, the offset values included in the DCI respectively transmitted in symbol #0 and symbol #3 are different values. The DCI transmitted in symbol #0 includes the offset value corresponding to 7-symbol+8-symbol (or 3 mini-slots). The DCI transmitted in symbol #3 includes the offset value corresponding to 4-symbol+5-symbol (or 2 mini-slots). The user terminal controls reception timing and/or transmission timing of the data, using the offset value notified by at least one DCI and the reception timing of the DCI.

In the case where the user terminal detects at least one NR-PDCCH, the terminal may halt detection of the NR-PDCCH of another beam. By such operation, it is possible to decrease processing loads on the user terminal. Alternatively, in the case where the user terminal receives a plurality of NR-PDCCHs (DCI), the terminal may combine a plurality of pieces of DCI to control reception and/or transmission of data.

Alternatively, the user terminal may control reception and/or transmission of data based on the first detected NR-PDCCH (DCI), or may control reception and/or transmission of data based on the last detected NR-PDCCH (DCI). In this case, when the user terminal receives a plurality of pieces of DCI for scheduling the same data, based on the predetermined DCI, the terminal determines at least one of scheduling timing, parameter used in reception processing and parameter (resources used in UL transmission, coding rate, etc.) used in transmission processing.
(Aspect 4)

Aspect 4 describes the case of controlling reception of DL data and/or transmission of UL data, using timing information included in DCI transmitted on a DL control channel (e.g., NR-PDCCH).

Using timing information included in the detected NR-PDCCH (DCI), a user terminal controls reception timing and/or transmission timing of data scheduled by the DCI. The timing information included in the DCI may be information (for example, absolute index of the scheduling unit) indicative of a position in which the data is scheduled. In other words, irrespective of reception timing of the NR-PDCCH (DCI), the user terminal is capable of determining scheduling timing of data, using the information designated by the DCI.

The timing information (for example, index of the scheduling unit) is a slot index within a subframe or within a radio frame. Alternatively, the timing information may be a mini-slot index within a slot, within a subframe or within a radio frame. Alternatively, the timing information may be a symbol index within a mini-slot, within a slot, within a subframe or within a radio frame.

Figure 8:
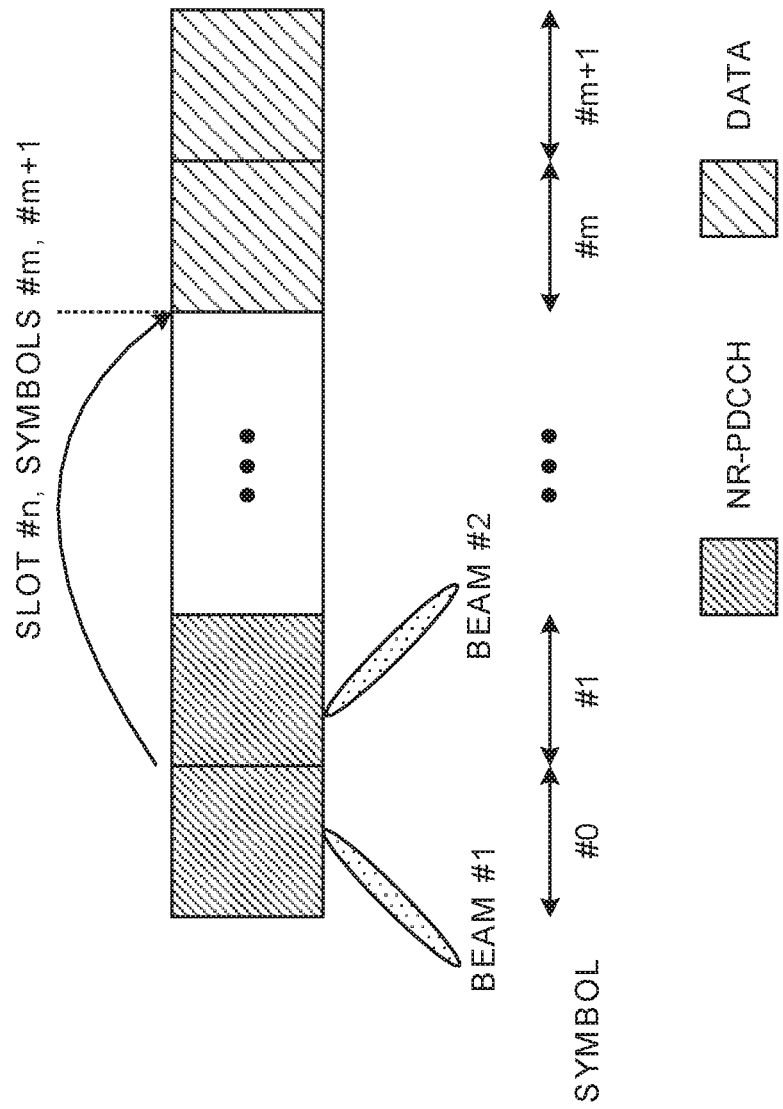
FIG. 8 is a diagram showing still another example of the method of controlling scheduling timing of data.

FIG. 8 illustrates the case where a plurality of NR-PDCCHs (DCI) for scheduling data (for example, the same data) of the same time resource is assigned to different time resources. FIG. 8 illustrates the case where NR-PDCCHs (DCI) for scheduling data transmitted in symbols #m and #m+1 (mini-slot #n) are respectively transmitted in symbol #0 and symbol #1. Further, the case is shown where different beams #1 and #2 (for example, BPLs) are applied to the NR-PDCCHs (DCI) respectively transmitted in symbol #0 and symbol #1.

In FIG. 8, scheduling timing of the data is controlled based on the timing information (for example, index of the scheduling unit) included in each DCI. Therefore, the timing information included in the DCI respectively transmitted in symbol #0 and symbol #1 indicates the same scheduling index.

Herein, the DCI transmitted in symbol #0 includes timing information indicative of slot #n and symbols #m+#m+1. Similarly, the DCI transmitted in symbol #1 also includes the timing information indicative of slot #n and symbols #m+#m+1. The user terminal controls reception timing and/or transmission timing of data, using the timing information notified by at least one DCI.

With respect to the timing information included in each DCI, candidates for a plurality of pieces of timing information may be beforehand associated with a plurality of pieces of bit information to set (for example, define a table). The radio base station may notify the user terminal of predetermined timing information, by notifying of predetermined bit information using the DCI. Further, the candidates for a plurality of pieces of timing information may be defined as fixed values, or may be set as appropriate using higher layer signaling and the like.

The timing information is specified using a predetermined time unit (e.g., scheduling unit). For example, the timing information is specified using at least one of an OFDM symbol, mini-slot and slot. Further, the timing information may be defined, by combining at least two of a plurality of scheduling units (OFDM symbol, mini-slot, slot, etc.)

Further, with respect to scheduling of DL data and scheduling of UL data, the timing information may be specified using different scheduling units. For example, the timing information included in DCI for scheduling DL data may be specified using the symbol and/or mini-slot, and the timing information included in DCI for scheduling UL data may be specified using the slot, mini-slot and/or symbol.

Furthermore, in the case where the user terminal detects at least one NR-PDCCH, the terminal may halt detection of the NR-PDCCH of another beam. By such operation, it is possible to decrease processing loads on the user terminal. Alternatively, in the case where the user terminal receives a plurality of NR-PDCCHs (DCI), the terminal may combine two pieces of DCI to control reception and/or transmission of data.

Alternatively, the user terminal may control reception and/or transmission of data based on the first detected NR-PDCCH (DCI), or may control reception and/or transmission of data based on the last detected NR-PDCCH (DCI). In this case, when the user terminal receives a plurality of pieces of DCI for scheduling the same data, based on the predetermined DCI, the terminal determines at least one of scheduling timing, parameter used in reception processing and parameter (resources used in UL transmission, coding rate, etc.) used in transmission processing.

(Modification)

The configurations shown in the above-mentioned Aspects 2 to 4 may be combined and applied. For example, an index of a slot in which data is scheduled is determined, based on the offset value included in the DCI, using the slot in which the NR-PDCCH (DCI) is transmitted as the reference timing. Then, a mini-slot index and/or symbol index in which the data is scheduled in the slot may be determined using another bit field (bit field different from the offset value) of the DCI.

Alternatively, a mini-slot index and/or symbol index in which data is scheduled is determined, based on the offset value included in the DCI, using the mini-slot and or symbol in which the NR-PDCCH (DCI) is transmitted as the reference timing. Then, an index of the slot in which the data is scheduled may be determined using another bit field (bit field different from the offset value) of the DCI.

Thus, by notifying the user terminal of the offset value and predetermined scheduling unit using DCI, it is possible to properly control scheduling of data in a predetermined region (mini-slot and/or symbol) within a predetermined slot.

(Radio Communication System)

A configuration of a radio communication system according to this Embodiment will be described below. In the radio communication system, communication is performed using any of the radio communication method according to each above-mentioned Embodiment of the present invention or combination thereof.

Figure 9:
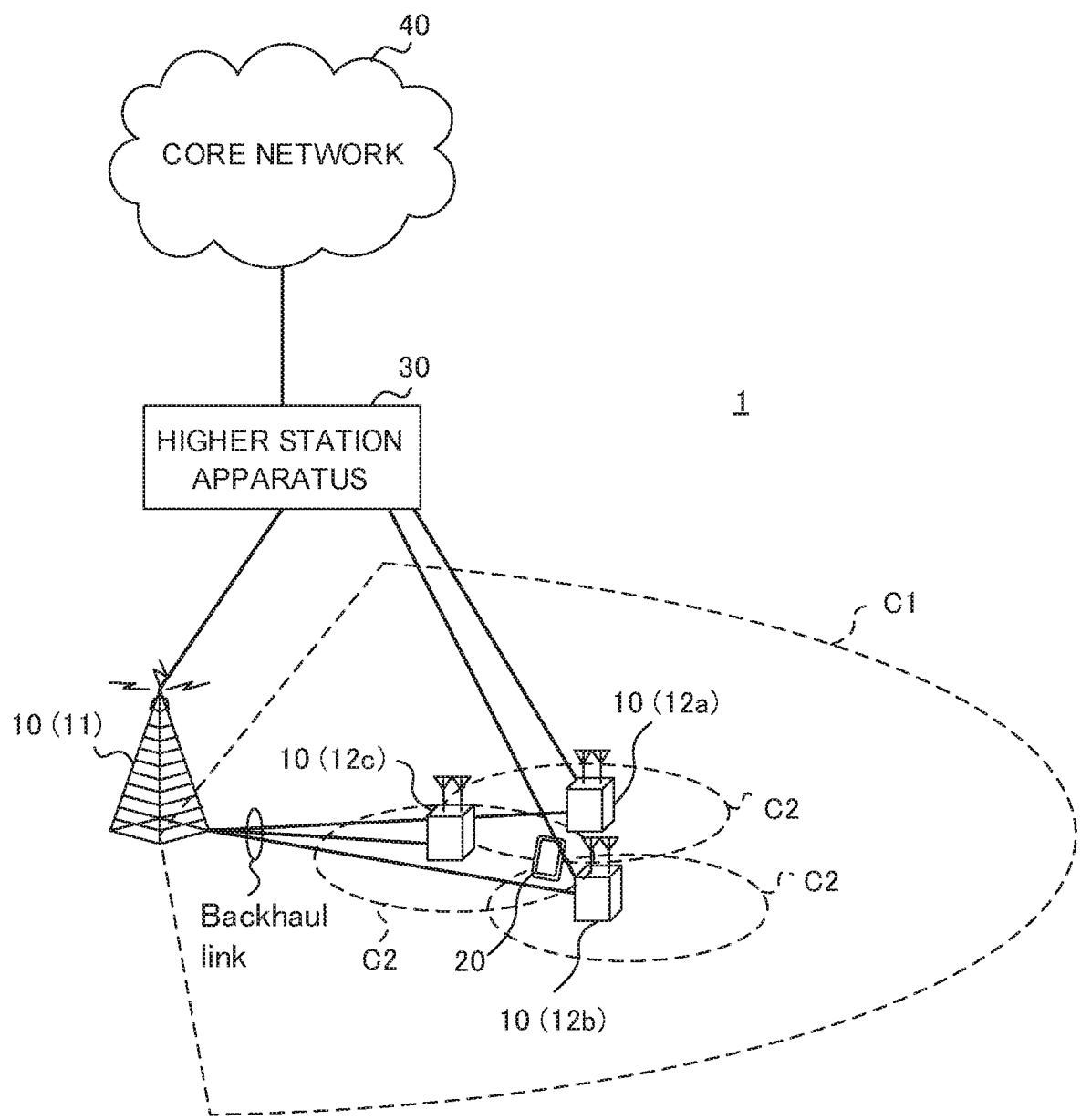
FIG. 9 is a diagram showing one example of a schematic configuration of a radio communication system according to this Embodiment.

FIG. 9 is a diagram showing one example of a schematic configuration of the radio communication system according to this Embodiment. In the radio communication system 1, it is possible to apply carrier aggregation (CA) to aggregate a plurality of base frequency blocks (component carriers) with a system bandwidth (e.g., 20 MHz) of the LTE system as one unit and/or dual connectivity (DC).

In addition, the radio communication system 1 may be called LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology) and the like, or may be called the system to actualize the aforementioned system.

The radio communication system 1 is provided with a radio base station 11 for forming a macrocell C1 with relatively wide coverage, and radio base stations 12 (12a to 12c) disposed inside the macrocell C1 to form small cells C2 narrower than the macrocell C1. Further, a user terminal 20 is disposed in the macrocell C1 and each of the small cells C2.

The user terminal 20 is capable of connecting to both the radio base station 11 and the radio base station 12. The user terminal 20 is assumed to concurrently use the macrocell C1 and small cell C2 using CA or DC. Further, the user terminal 20 may apply CA or DC using a plurality of cells (CCs) (e.g., 5 CCs or less, 6 CCs or more).

The user terminal 20 and radio base station 11 are capable of communicating with each other using carriers (called the existing carrier, Legacy carrier and the like) with a narrow bandwidth in a relatively low frequency band (e.g., 2 GHz). On the other hand, the user terminal 20 and radio base station 12 may use carriers with a wide bandwidth in a relatively high frequency band (e.g., 3 GHz~40 GHz, etc.), or may use the same carrier as in the radio base station 11. In addition, the configuration of the frequency band used in each radio base station is not limited thereto.

It is possible to configure so that the radio base station 11 and radio base station 12 (or, two radio base stations 12) undergo wired connection (e.g., optical fiber in conformity with CPRI (Common Public Radio Interface), X2 interface and the like), or wireless connection.

The radio base station 11 and each of the radio base stations 12 are respectively connected to a higher station apparatus 30, and are connected to a core network 40 via the higher station apparatus 30. In addition, for example, the higher station apparatus 30 includes an access gateway apparatus, Radio Network Controller (RNC), Mobility Management Entity (MME) and the like, but is not limited thereto. Further, each of the radio base stations 12 may be connected to the higher station apparatus 30 via the radio base station 11.

In addition, the radio base station 11 is a radio base station having relatively wide coverage, and may be called a macro base station, collection node, eNB (eNodeB), transmission and reception point and the like. Further, the radio base station 12 is a radio base station having local coverage, and may be called a small base station, micro-base station, pico-base station, femto-base station, HeNB (Home eNodeB), RRH (Remote Radio Head), transmission and reception point and the like. Hereinafter, in the case of not distinguishing between the radio base stations 11 and 12, the stations are collectively called a radio base station 10.

Each user terminal 20 is a terminal supporting various communication schemes such as LTE and LTE-A, and may include a fixed communication terminal (fixed station), as well as the mobile communication terminal (mobile station).

In the radio communication system 1, as radio access schemes, Orthogonal Frequency Division Multiple Access (OFDMA) is applied on downlink, and Single Carrier Frequency Division Multiple Access (SC-FDMA) and/or OFDMA is applied on uplink.

OFDMA is a multicarrier transmission scheme for dividing a frequency band into a plurality of narrow frequency bands (subcarriers), and mapping data to each subcarrier to perform communication. SC-FDMA is a single-carrier transmission scheme for dividing a system bandwidth into bands comprised of a single or contiguous resource blocks for each terminal so that a plurality of terminals uses mutually different bands, and thereby reducing interference among terminals. In addition, uplink and downlink radio access schemes are not limited to the combination of the schemes, and another radio access scheme may be used.

As downlink (DL) channels, in the radio communication system 1 are used a DL data channel (PDSCH: Physical Downlink Shared Channel) shared by user terminals 20, broadcast channel (PBCH: Physical Broadcast Channel), downlink L1/L2 control channels and the like. User data, higher layer control information, SIB (System Information Block) and the like are transmitted on the PDSCH. Further, MIB (Master Information Block) is transmitted on the PBCH.

The downlink L1/L2 control channel includes PDCCH (Physical Downlink Control Channel), EPDCCH (Enhanced Physical Downlink Control channel), PCFICH (Physical Control Format Indicator Channel), PHICH (Physical Hybrid-ARQ Indicator Channel) and the like. The downlink control information (DCI) including scheduling information of the PDSCH and PUSCH and the like is transmitted on the PDCCH. The number of OFDM symbols used in the PDCCH is transmitted on the PCFICH. Receipt confirmation information (e.g., also referred to as retransmission control information, HARQ-ACK, ACK/NACK, and the like) of HARQ (Hybrid Automatic Repeat reQuest) for the PUSCH is transmitted on the PHICH. The EPDCCH is frequency division multiplexed with the PDSCH to be used in transmitting the DCI and the like as the PDCCH. The PDCCH and/or EPDCCH are also called the DL control channel, NR-PDCCH and the like.

As uplink (UL) channels, in the radio communication system 1 are used a UL data channel (PUSCH: Physical Uplink Shared Channel) shared by user terminals 20, UL control channel (PUCCH: Physical Uplink Control Channel), random access channel (PRACH: Physical Random Access Channel) and the like. User data and higher layer control information is transmitted on the PUSCH. Further, radio quality information (CQI: Channel Quality Indicator) of downlink, receipt confirmation information and the like are transmitted on the PUCCH. A random access preamble to establish connection with the cell is transmitted on the PRACH.

As DL reference signals, in the radio communication system 1 are transmitted Cell-specific Reference Signal (CRS), Channel State Information-Reference Signal (CSI-RS), DeModulation Reference Signal (DMRS), Positioning Reference Signal (PRS), Mobility Reference Signal (MRS) and the like. Further, as UL reference signals, in the radio communication system 1 are transmitted Sounding Reference Signal (SRS), DeModulation Reference Signal (DMRS) and the like. In addition, the DMRS may be called UE-specific Reference Signal. Further, the transmitted reference signals are not limited thereto. Furthermore, in the radio communication system 1, synchronization signals (PSS and/or SSS), broadcast channel (PBCH) and the like are transmitted on downlink.

<Radio Base Station>

Figure 10:
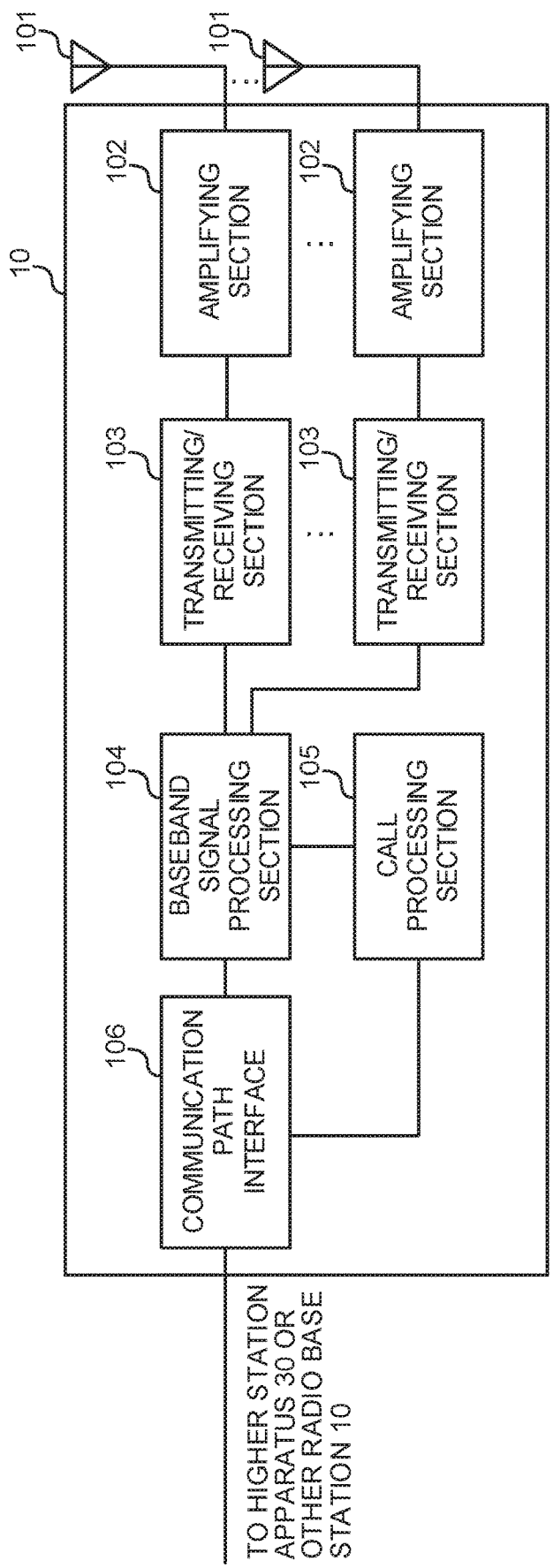
FIG. 10 is a diagram showing one example of an entire configuration of a radio base station according to this Embodiment.

FIG. 10 is a diagram showing one example of an entire configuration of the radio base station according to this Embodiment. The radio base station 10 is provided with a plurality of transmitting/receiving antennas 101, amplifying sections 102, transmitting/receiving sections 103, baseband signal processing section 104, call processing section 105, and communication path interface 106. In addition, with respect to each of the transmitting/receiving antenna 101, amplifying section 102, and transmitting/receiving section 103, the radio base station may be configured to include at least one or more.

User data to transmit to the user terminal 20 from the radio base station 10 on downlink is input to the baseband signal processing section 104 from the higher station apparatus 30 via the communication path interface 106.

The baseband signal processing section 104 performs, on the user data, transmission processing such as processing of PDCP (Packet Data Convergence Protocol) layer, segmentation and concatenation of the user data, transmission processing of RLC (Radio Link Control) layer such as RLC retransmission control, MAC (Medium Access Control) retransmission control (e.g., transmission processing of HARQ), scheduling, transmission format selection, channel coding, Inverse Fast Fourier Transform (IFFT) processing, and precoding processing to transfer to the transmitting/receiving sections 103. Further, also concerning a DL control signal, the section 104 performs transmission processing such as channel coding and Inverse Fast Fourier Transform on the signal to transfer to the transmitting/receiving sections 103.

Each of the transmitting/receiving sections 103 converts the baseband signal, which is subjected to precoding for each antenna and is output from the baseband signal processing section 104, into a signal with a radio frequency band to transmit. The radio-frequency signal subjected to frequency conversion in the transmitting/receiving section 103 is amplified in the amplifying section 102, and is transmitted from the transmitting/receiving antenna 101. The transmitting/receiving section 103 is capable of being comprised of a transmitter/receiver, transmitting/receiving circuit or transmitting/receiving apparatus explained based on common recognition in the technical field according to the present invention. In addition, the transmitting/receiving section 103 may be comprised as an integrated transmitting/receiving section, or may be comprised of a transmitting section and receiving section.

On the other hand, for UL signals, radio-frequency signals received in the transmitting/receiving antennas 101 are amplified in the amplifying sections 102. The transmitting/ receiving section 103 receives the UL signal amplified in the amplifying section 102. The transmitting/receiving section 103 performs frequency conversion on the received signal into a baseband signal to output to the baseband signal processing section 104.

For user data included in the input UL signal, the baseband signal processing section 104 performs Fast Fourier Transform (FFT) processing, Inverse Discrete Fourier Transform (IDFT) processing, error correcting decoding, reception processing of MAC retransmission control, and reception processing of RLC layer and PDCP layer to transfer to the higher station apparatus 30 via the communication path interface 106. The call processing section 105 performs call processing such as setting and release of a communication channel, state management of the radio base station 10, and management of radio resources.

The communication path interface 106 transmits and receives signals to/from the higher station apparatus 30 via a predetermined interface. Further, the communication path interface 106 may transmit and receive signals (backhaul signaling) to/from another radio base station 10 via an inter-base station interface (e.g., optical fiber in conformity with CPRI (Common Public Radio Interface), X2 interface).

In addition, the transmitting/receiving section 103 may further have an analog beam forming section for performing analog beam forming. The analog beam forming section is capable of being comprised of an analog beam forming circuit (e.g., phase shifter, phase shift circuit) or analog beam forming apparatus (e.g., phase shift device) explained based on the common recognition in the technical field according to the present invention. Further, for example, the transmitting/receiving antenna 101 is capable of being comprised of an array antenna. Furthermore, the transmitting/receiving section 103 is configured to be able to apply single BF and multi-BF.

The transmitting/receiving section 103 transmits a DL signal (e.g., at least one of NR-PDCCH/PDSCH, mobility measurement signal, CSI-RS, DMRS, DCI and DL data), and receives a UL signal (e.g., at least one of PUCCH, PUSCH, recovery signal, measurement report, beam report, CSI report, UCI and UL data).

Further, the transmitting/receiving section 103 transmits NR-PDCCHs (DCI) in different time regions and/or frequency regions using a plurality of beams. The transmitting/receiving section 103 may include timing information in the DCI to transmit. The timing information may be any one of an offset value from beforehand set reference timing, an offset value from reception timing of the DCI, and information indicative of an index of a predetermined scheduling unit. Furthermore, the transmitting/receiving section 103 may notify of information on the reference timing.

Figure 11:
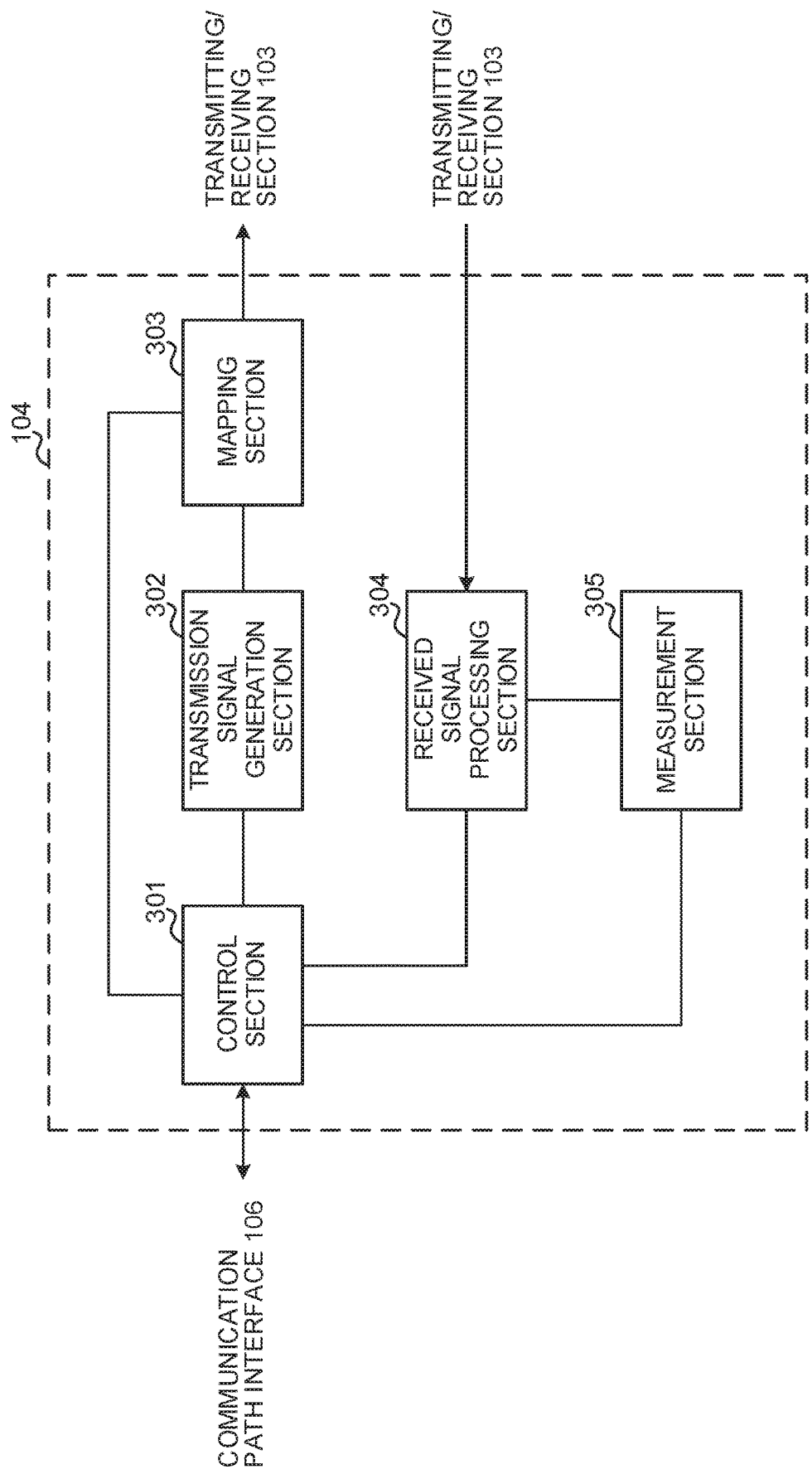
FIG. 11 is a diagram showing one example of a function configuration of the radio base station according to this Embodiment.

FIG. 11 is a diagram showing one example of a function configuration of the radio base station according to this Embodiment. In addition, this example mainly illustrates function blocks of a characteristic portion in this Embodiment, and the radio base station 10 is assumed to have other function blocks required for radio communication.

The baseband signal processing section 104 is provided with at least a control section (scheduler) 301, transmission signal generating section 302, mapping section 303, received signal processing section 304, and measurement section 305. In addition, these components are essentially included in the radio base station 10, and a part or the whole of the components may not be included in the baseband signal processing section 104.

The control section (scheduler) 301 performs control of the entire radio base station 10. The control section 301 is capable of being comprised of a controller, control circuit or control apparatus explained based on the common recognition in the technical field according to the present invention.

For example, the control section 301 controls generation of signals by the transmission signal generating section 302, and allocation of signals by the mapping section 303. Further, the control section 301 controls reception processing of signals by the received signal processing section 304, and measurement of signals by the measurement section 305.

The control section 310 controls scheduling of DL data channel and UL data channel, and controls generation and transmission of DCI (DL assignment) for scheduling the DL data channel, and DCI (UL grant) for scheduling the UL data channel The control section 301 controls to form Tx beams and/or Rx beams, using digital BF (e.g., precoding) by the baseband signal processing section 104 and/or analog BF (e.g., phase rotation) by the transmitting/receiving section 103. For example, the control section 301 controls beams (Tx beams and/or Rx beams) used in transmission and/or reception of the DL signal (e.g., NR-PDCCH/PDSCH).

Based on instructions from the control section 301, the transmission signal generating section 302 generates DL signals to output to the mapping section 303. The transmission signal generating section 302 is capable of being comprised of a signal generator, signal generating circuit or signal generating apparatus explained based on the common recognition in the technical field according to the present invention.

For example, based on instructions from the control section 301, the transmission signal generating section 302 generates the DCI (DL assignment, UL grant). Further, the DL data channel (PDSCH) is subjected to coding processing, modulation processing and beam forming processing (precoding processing), according to a coding rate, modulation scheme and the like determined based on the CSI and the like from each user terminal 20.

Based on instructions from the control section 301, the mapping section 303 maps the DL signal generated in the transmission signal generating section 302 to predetermined radio resources to output to the transmitting/receiving section 103. The mapping section 303 is capable of being comprised of a mapper, mapping circuit or mapping apparatus explained based on the common recognition in the technical field according to the present invention.

The received signal processing section 304 performs reception processing (e.g., demapping, demodulation, decoding, etc.) on the received signal input from the transmitting/receiving section 103. Herein, for example, the received signal is the UL signal transmitted from the user terminal 20. The received signal processing section 304 is capable of being comprised of a signal processor, signal processing circuit or signal processing apparatus explained based on the common recognition in the technical field according to the present invention.

The received signal processing section 304 outputs the information decoded by the reception processing to the control section 301. For example, in the case of receiving feedback information (e.g., CSI, HARQ-ACK, etc.) from the user terminal, the section 304 outputs the feedback information to the control section 301. Further, the received signal processing section 304 outputs the received signal and signal subjected to the reception processing to the measurement section 305.

The measurement section 305 performs measurement on the received signal. The measurement section 305 is capable of being comprised of a measurement device, measurement circuit or measurement apparatus explained based on the common recognition in the technical field according to the present invention.

For example, the measurement section 305 may measure received power (e.g., RSRP (Reference Signal Received Power)), received quality (e.g., RSRQ (Reference Signal Received Quality), SINR (Signal to Interference plus Noise Ratio)), channel state and the like of the received signal. The measurement result may be output to the control section 301.
<User Terminal>

Figure 12:
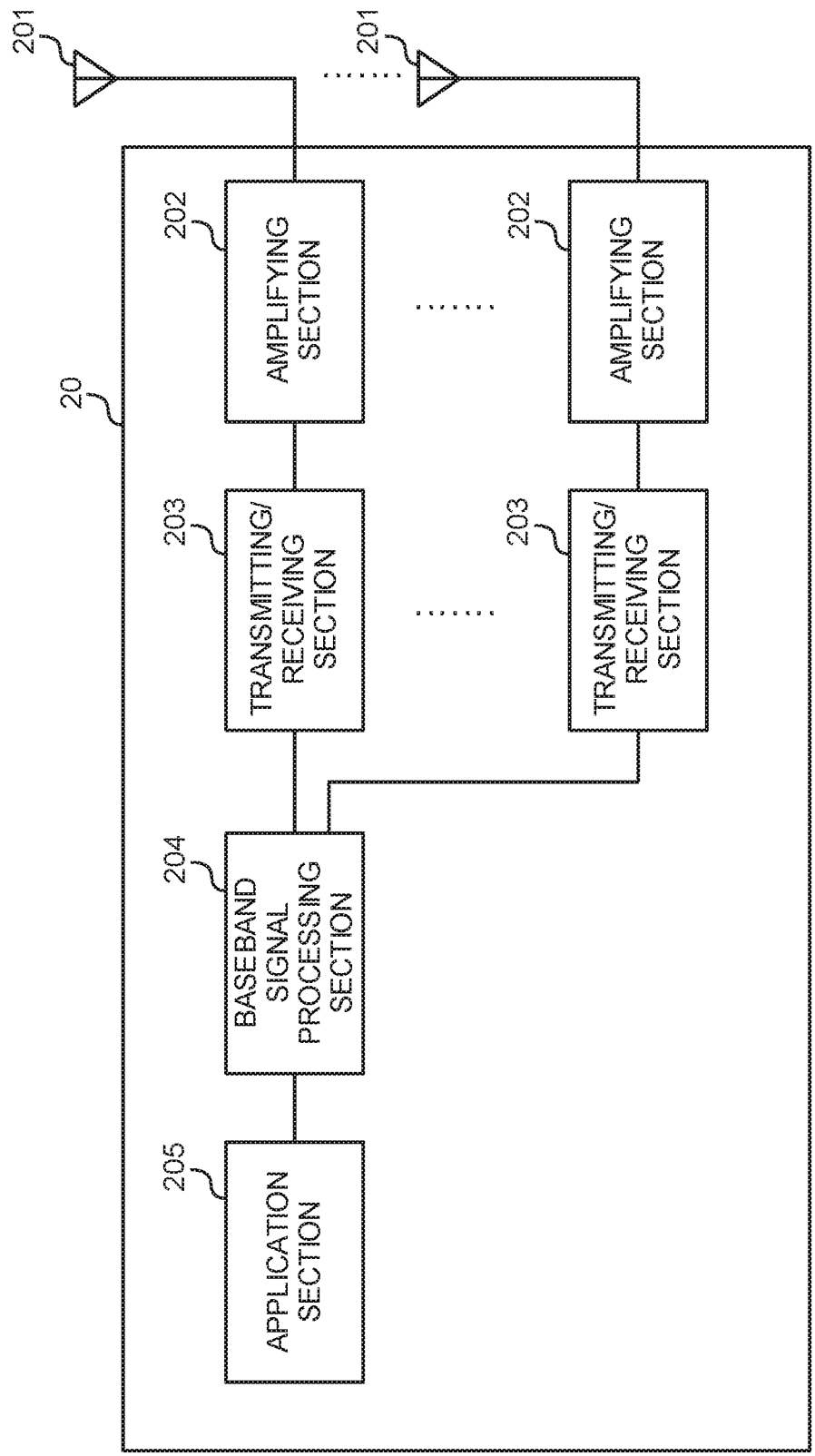
FIG. 12 is a diagram showing one example of an entire configuration of a user terminal according to this Embodiment.

FIG. 12 is a diagram showing one example of an entire configuration of the user terminal according to this Embodiment. The user terminal 20 is provided with a plurality of transmitting/receiving antennas 201, amplifying sections 202, transmitting/receiving sections 203, baseband signal processing section 204, and application section 205. In addition, with respect to each of the transmitting/receiving antenna 201, amplifying section 202, and transmitting/receiving section 203, the user terminal may be configured to include at least one or more.

Radio-frequency signals received in the transmitting/receiving antennas 201 are respectively amplified in the amplifying sections 202. Each of the transmitting/receiving sections 203 receives the DL signal amplified in the amplifying section 202. The transmitting/receiving section 203 performs frequency conversion on the received signal into a baseband signal to output to the baseband signal processing section 204. The transmitting/receiving section 203 is capable of being comprised of a transmitter/receiver, transmitting/receiving circuit or transmitting/receiving apparatus explained based on the common recognition in the technical field according to the present invention. In addition, the transmitting/receiving section 203 may be comprised as an integrated transmitting/receiving section, or may be comprised of a transmitting section and receiving section.

The baseband signal processing section 204 performs FFT processing, error correcting decoding, reception processing of retransmission control and the like on the input baseband signal. User data on downlink is transferred to the application section 205. The application section 205 performs processing concerning layers higher than the physical layer and MAC layer, and the like. Further, among the downlink data, broadcast information is also transferred to the application section 205.

On the other hand, for user data on uplink, the data is input to the baseband signal processing section 204 from the application section 205. The baseband signal processing section 204 performs transmission processing of retransmission control (e.g., transmission processing of HARQ), channel coding, precoding, Discrete Fourier Transform (DFT) processing, IFFT processing and the like to transfer to each of the transmitting/receiving sections 203. Each of the transmitting/receiving sections 203 converts the baseband signal output from the baseband signal processing section 204 into a signal with a radio frequency band to transmit. The radio-frequency signals subjected to frequency conversion in the transmitting/receiving sections 203 are amplified in the amplifying sections 202, and transmitted from the transmitting/receiving antennas 201, respectively.

In addition, the transmitting/receiving section 203 may further have an analog beam forming section for performing analog beam forming. The analog beam forming section is capable of being comprised of an analog beam forming circuit (e.g., phase shifter, phase shift circuit) or analog beam forming apparatus (e.g., phase shift device) explained based on the common recognition in the technical field according to the present invention. Further, for example, the transmitting/receiving antenna 201 is capable of being comprised of an array antenna. Furthermore, the transmitting/receiving section 203 is configured to be able to apply single BF and multi-BF.

The transmitting/receiving section 203 receives a DL signal (e.g., at least one of NR-PDCCH/PDSCH, mobility measurement signal, CSI-RS, DMRS, DCI and DL data), and transmits a UL signal (e.g., at least one of PUCCH, PUSCH, recovery signal, measurement report, beam report, CSI report, UCI and UL data).

Further, the transmitting/receiving section 203 receives (monitors) one or more NR-PDCCHs (or, NR-PDCCH candidates, candidate regions for NR-PDCCHs) transmitted in different time regions and/or frequency regions (one or more beams) in the different time regions and/or frequency regions. The transmitting/receiving section 203 may receive timing information included in the DCI. The timing information may be any one of an offset value from beforehand set reference timing, an offset value from reception timing of the DCI, and information indicative of an index of a predetermined scheduling unit. Furthermore, the transmitting/receiving section 303 may receive information on the reference timing.

Figure 13:
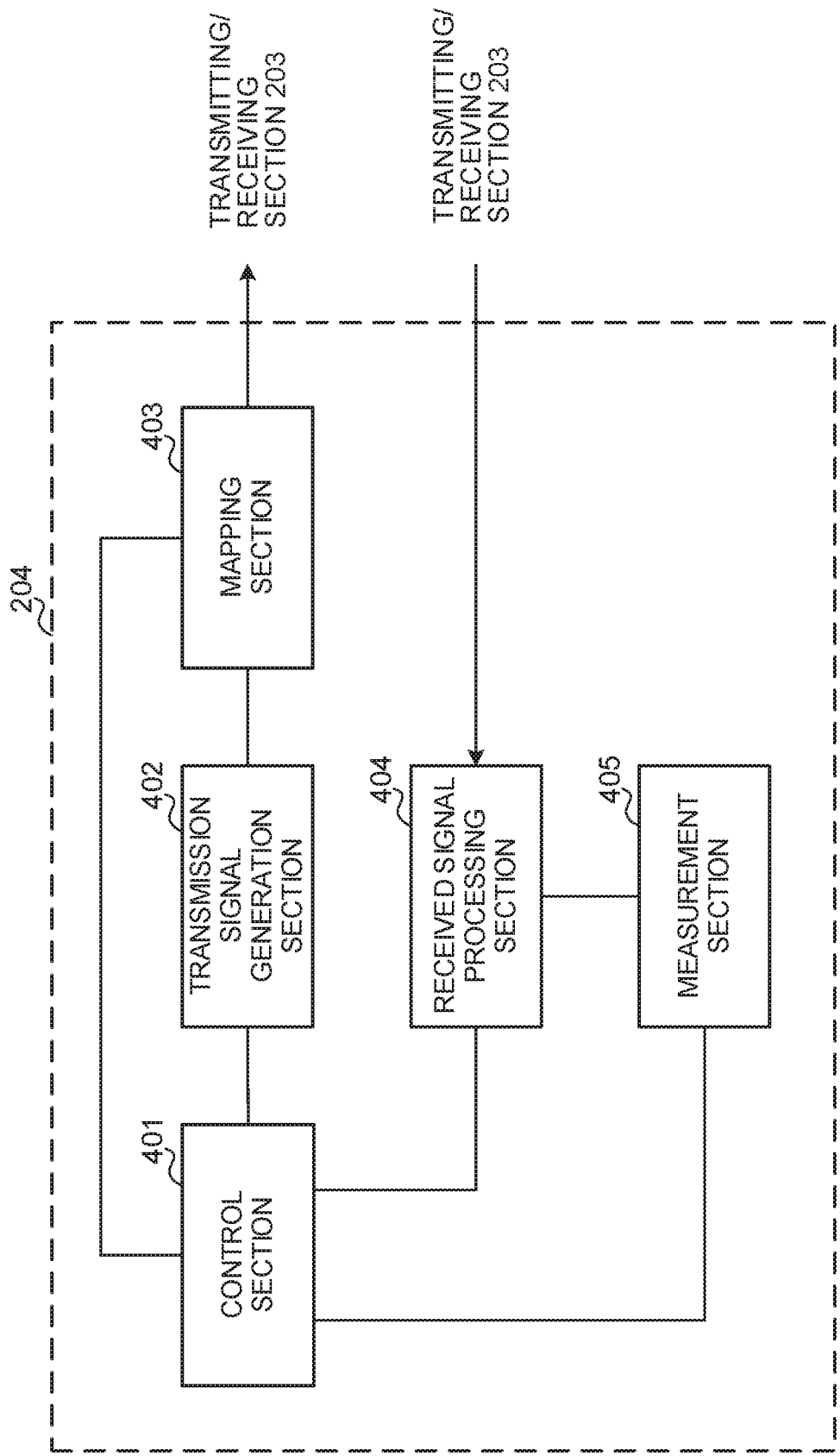
FIG. 13 is a diagram showing one example of a function configuration of the user terminal according to this Embodiment.

FIG. 13 is a diagram showing one example of a function configuration of the user terminal according to this Embodiment. In addition, this example mainly illustrates function blocks of a characteristic portion in this Embodiment, and the user terminal 20 is assumed to have other function blocks required for radio communication.

The baseband signal processing section 204 that the user terminal 20 has is provided with at least a control section 401, transmission signal generating section 402, mapping section 403, received signal processing section 404, and measurement section 405. In addition, these components are essentially included in the user terminal 20, and a part or the whole of the components may not be included in the baseband signal processing section 204.

The control section 401 performs control of the entire user terminal 20. The control section 401 is capable of being comprised of a controller, control circuit or control apparatus explained based on the common recognition in the technical field according to the present invention.

For example, the control section 401 controls generation of signals by the transmission signal generating section 402, and allocation of signals by the mapping section 403. Further, the control section 401 controls reception processing of signals by the received signal processing section 404, and measurement of signals by the measurement section 405.

The control section 401 acquires the DL control signal (DL control channel) and DL data signal (DL data channel) transmitted from the radio base station 10, from the received signal processing section 404. Based on the DL control signal, a result obtained by determining the necessity of retransmission control to the DL data signal, and the like, the control section 401 controls generation of a UL control signal (e.g., receipt confirmation information, etc.) and UL data signal.

The control section 401 controls to form transmission beams and/or reception beams, using digital BF (e.g., precoding) by the baseband signal processing section 204 and/or analog BF (e.g., phase rotation) by the transmitting/receiving section 203. For example, the control section 301 controls beams (Tx beams and/or Rx beams) used in reception of the DL signal (e.g., NR-PDCCH/PDSCH).

The control section 401 controls reception and/or transmission of data scheduled by DCI, and based on at least the timing information included in the DCI, controls reception timing and/or transmission timing of the data. When the timing information is an offset value from beforehand set reference timing, based on the reference timing and the offset value, the control section 401 controls reception timing and/or transmission timing of the data (see FIGS. 4 to 6).

Alternatively, when the timing information is an offset value from reception timing of the DCI, based on the reception timing of the DCI and the offset value, the control section 401 controls reception timing and/or transmission timing of the data (see FIG. 7). Alternatively, when the timing information is information indicative of an index of a predetermined scheduling unit, based on the information indicative of the index, the control section 401 controls reception timing and/or transmission timing of the data (see FIG. 8).

Further, in the case of detecting a plurality of pieces of DCI for scheduling the data of the same time resource, the control section 401 may control reception and/or transmission of the data, based on the first detected DCI and/or the last detected DCI.

Based on instructions from the control section 401, the transmission signal generating section 402 generates UL signals (UL control signal, UL data signal, UL reference signal and the like) to output to the mapping section 403. The transmission signal generating section 402 is capable of being comprised of a signal generator, signal generating circuit or signal generating apparatus explained based on the common recognition in the technical field according to the present invention.

Based on instructions from the control section 401, for example, the transmission signal generating section 402 generates feedback information (e.g., at least one of HARQ-ACK, CSI and scheduling request). Further, based on instructions from the control section 401, the transmission signal generating section 402 generates the uplink data signal. For example, when the DL control signal notified from the radio base station 10 includes the UL grant, the transmission signal generating section 402 is instructed to generate the uplink data signal from the control section 401.

Based on instructions from the control section 401, the mapping section 403 maps the UL signal generated in the transmission signal generating section 402 to radio resources to output to the transmitting/receiving section 203. The mapping section 403 is capable of being comprised of a mapper, mapping circuit or mapping apparatus explained based on the common recognition in the technical field according to the present invention.

The received signal processing section 404 performs reception processing (e.g., demapping, demodulation, decoding, etc.) on the received signal input from the transmitting/receiving section 203. Herein, for example, the received signal is the DL signal (DL control signal, DL data signal, DL reference signal and the like) transmitted from the radio base station 10. The received signal processing section 404 is capable of being comprised of a signal processor, signal processing circuit or signal processing apparatus explained based on the common recognition in the technical field according to the present invention. Further, the received signal processing section 404 is capable of constituting the receiving section according to the present invention.

The received signal processing section 404 outputs the information decoded by the reception processing to the control section 401. For example, the received signal generating section 404 outputs the broadcast information, system information, RRC signaling, DCI and the like to the control section 401. Further, the received signal processing section 404 outputs the received signal and signal subjected to the reception processing to the measurement section 405.

The measurement section 405 performs measurement on the received signal. For example, the measurement section 405 performs measurement using a mobility measurement signal and/or CSI-RS resource transmitted from the radio base station 10. The measurement section 405 is capable of being comprised of a measurement device, measurement circuit or measurement apparatus explained based on the common recognition in the technical field according to the present invention.

For example, the measurement section 405 may measure received power (e.g., RSRP), received quality (e.g., RSRQ, received SINR), channel state and the like of the received signal. The measurement result may be output to the control section 401.

<Hardware Configuration>

In addition, the block diagrams used in explanation of the above-mentioned Embodiment show blocks on a function-by-function basis. These function blocks (configuration sections) are actualized by any combination of hardware and/or software. Further, the means for actualizing each function block is not limited particularly. In other words, each function block may be actualized by a single apparatus combined physically and/or logically, or two or more apparatuses that are separated physically and/or logically are connected directly and/or indirectly (e.g., by cable and/or radio), and each function block may be actualized by a plurality of these apparatuses.

Figure 14:
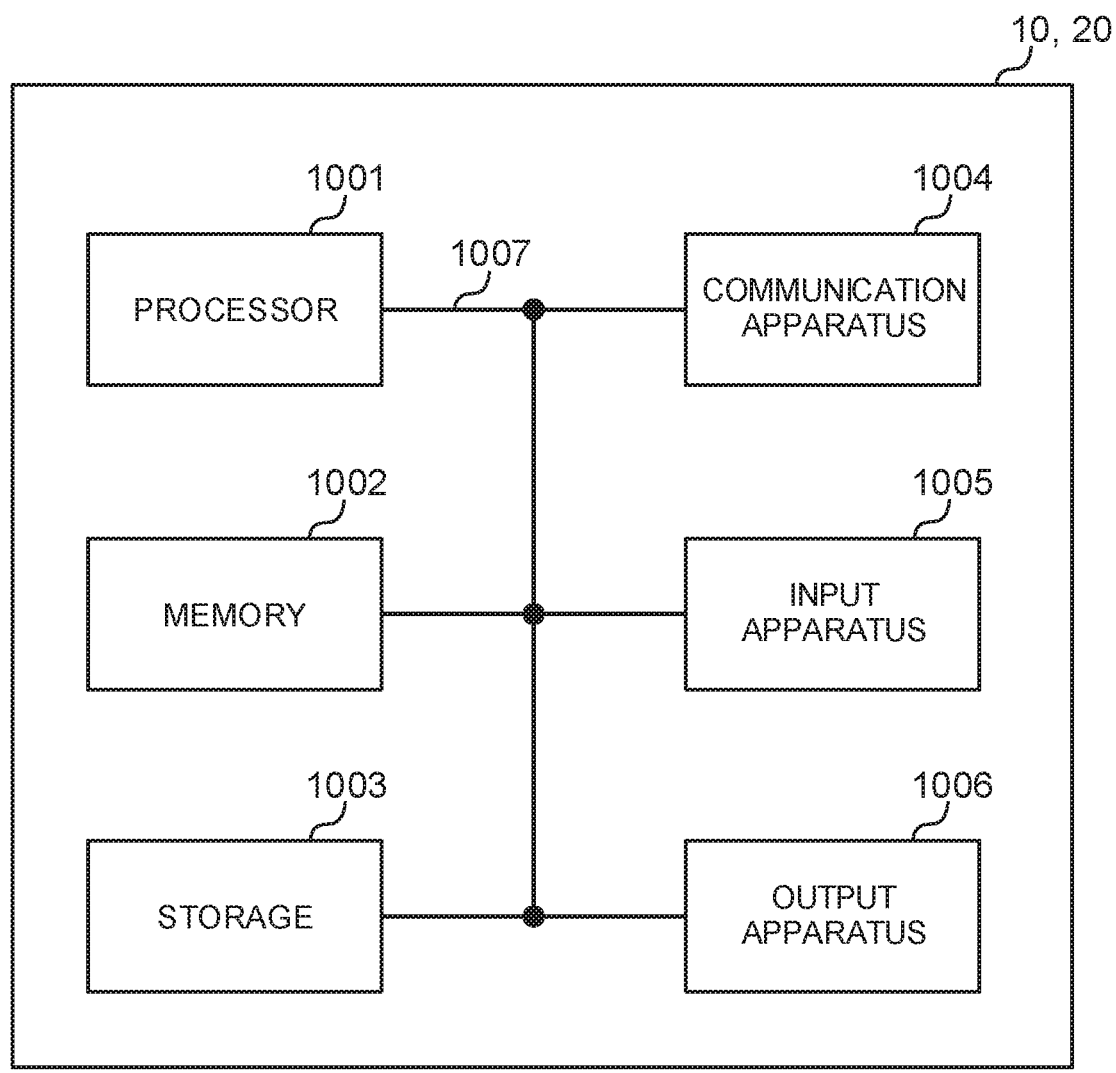
FIG. 14 is a diagram showing one example of hardware configurations of the radio base station and user terminal according to this Embodiment.

For example, each of the radio base station, user terminal and the like in one Embodiment of the present invention may function as a computer that performs the processing of the radio communication method of the invention. FIG. 14 is a diagram showing one example of a hardware configuration of each of the radio base station and user terminal according to one Embodiment of the invention. Each of the radio base station 10 and user terminal 20 as described above may be physically configured as a computer apparatus including a processor 1001, memory 1002, storage 1003, communication apparatus 1004, input apparatus 1005, output apparatus 1006, bus 1007 and the like.

In addition, in the following description, it is possible to replace the letter of "apparatus" with a circuit, device, unit and the like to read. With respect to each apparatus shown in the figure, the hardware configuration of each of the radio base station 10 and the user terminal 20 may be configured so as to include a single or a plurality, or may be configured without including a part of apparatuses.

For example, a single processor 1001 is shown in the figure, but a plurality of processors may exist. Further, the processing may be executed by a single processor, or may be executed by one or more processors at the same time, sequentially or by another technique. In addition, the processor 1001 may be implemented on one or more chips.

For example, each function in the radio base station 10 and user terminal 20 is actualized in a manner such that predetermined software (program) is read on the hardware of the processor 1001, memory 1002 and the like, and that the processor 1001 thereby performs computations, and controls communication by the communication apparatus 1004, and read and/or write of data in the memory 1002 and storage 1003.

For example, the processor 1001 operates an operating system to control the entire computer. The processor 1001 may be comprised of a Central Processing Unit (CPU) including interfaces with peripheral apparatuses, control apparatus, computation apparatus, register and the like. For example, the above-mentioned baseband signal processing section 104 (204), call processing section 105 and the like may be actualized by the processor 1001.

Further, the processor 1001 reads the program (program code), software module, data and the like on the memory 1002 from the storage 1003 and/or the communication apparatus 1004, and according thereto, executes various kinds of processing. Used as the program is a program that causes the computer to execute at least a part of operation described in the above-mentioned Embodiment. For example, the control section 401 of the user terminal 20 may be actualized by a control program stored in the memory 1002 to operate in the processor 1001, and the other function blocks may be actualized similarly.

The memory 1002 is a computer-readable storage medium, and for example, may be comprised of at least one of ROM (Read Only Memory), EPROM (Erasable Programmable ROM), EEPROM (Electrically EPROM), RAM (Random Access Memory) and other proper storage media. The memory 1002 may be called the register, cache, main memory (main storage apparatus) and the like. The memory 1002 is capable of storing the program (program code), software module and the like executable to implement the radio communication method according to one Embodiment of the present invention.

The storage 1003 is a computer-readable storage medium, and for example, may be comprised of at least one of a flexible disk, floppy (Registered Trademark) disk, magneto-optical disk (e.g., compact disk (CD-ROM (Compact Disc ROM), etc.), digital multi-purpose disk, Blu-ray (Registered Trademark) disk), removable disk, hard disk drive, smart card, flash memory device (e.g., card, stick, key drive), magnetic stripe, database, server and other proper storage media. The storage 1003 may be called an auxiliary storage apparatus.

The communication apparatus 1004 is hardware (transmitting/receiving device) to perform communication between computers via a wired and/or wireless network, and for example, is also referred to as a network device, network controller, network card, communication module and the like. For example, in order to actualize Frequency Division Duplex (FDD) and/or Time Division Duplex (TDD), the communication apparatus 1004 may be comprised by including a high-frequency switch, duplexer, filter, frequency synthesizer and the like.
For example, the transmitting/receiving antenna 101 (201), amplifying section 102 (202), transmitting/receiving section 103 (203), communication path interface 106 and the like as described above may be actualized by the communication apparatus 1004.

The input apparatus 1005 is an input device (e.g., keyboard, mouse, microphone, switch, button, sensor, etc.) that receives input from the outside. The output apparatus 1006 is an output device (e.g., display, speaker, LED (Light Emitting Diode) lamp, etc.) that performs output to the outside. In addition, the input apparatus 1005 and output apparatus 1006 may be an integrated configuration (e.g., touch panel).

Further, each apparatus of the processor 1001, memory 1002 and the like is connected on the bus 1007 to communicate information. The bus 1007 may be comprised of a single bus, or may be comprised of different buses between apparatuses.

Furthermore, each of the radio base station 10 and user terminal 20 may be configured by including hardware such as a microprocessor, Digital Signal Processor (DSP), ASIC (ApplicatioN Specific Integrated Circuit), PLD (Programmable Logic Device), and FPGA (Field Programmable Gate Array), or a part or the whole of each function block may be actualized by the hardware. For example, the processor 1001 may be implemented by at least one of the hardware.
(Modification)

In addition, the term explained in the present Description and/or the term required to understand the present Description may be replaced with a term having the same or similar meaning. For example, the channel and/or the symbol may be a signal (signaling). Further, the signal may be a message. The reference signal is capable of being abbreviated as RS (Reference Signal), and according to the standard to apply, may be called a pilot, pilot signal and the like. Furthermore, a component carrier (CC) may be called a cell, frequency carrier, carrier frequency and the like.

Further, the radio frame may be comprised of a single or a plurality of frames in the time domain. The single or each of the plurality of frames constituting the radio frame may be called a subframe. Furthermore, the subframe may be comprised of a single or a plurality of slots in the time domain. The subframe may be a fixed time length (e.g., 1 ms) that is not dependent on numerology.

Furthermore, the slot may be comprised of a single or a plurality of symbols (OFDM (Orthogonal Frequency Division Multiplexing) symbols, SC-FDMA (Single Carrier Frequency Division Multiple Access) symbols and the like) in the time domain. Still furthermore, the slot may a time length based on numerology. Moreover, the slot may include a plurality of mini-slots. Each mini-slot may be comprised of a single or a plurality of symbols in the time domain. Further, the mini-slot may be called a subslot.

Each of the radio frame, subframe, slot, mini-slot and symbol represents a time unit in transmitting a signal. For the radio frame, subframe, slot, mini-slot and symbol, another name corresponding to each of them may be used. For example, one subframe may be called Transmission Time Interval (TTI), a plurality of contiguous subframes may be called TTI, or one slot or one mini-slot may be called TTI. In other words, the subframe and/or TTI may be the subframe (1 ms) in the existing LTE, may be a frame (e.g., 1 to 13 symbols) shorter than 1 ms, or may be a frame longer than 1 ms. In addition, instead of the subframe, the unit representing the TTI may be called the slot, mini-slot and the like.

Herein, for example, the TTI refers to a minimum time unit of scheduling in radio communication. For example, in the LTE system, the radio base station performs scheduling for allocating radio resources (frequency bandwidth, transmit power and the like capable of being used in each user terminal) to each user terminal in a TTI unit. In addition, the definition of the TTI is not limited thereto.

The TTI may be a transmission time unit of a data packet (transport block) subjected to channel coding, code block and/or codeword, or may be a processing unit of scheduling, link adaptation and the like. In addition, when the TTI is given, a time segment (e.g., the number of symbols) to which the transport block, code block and/or codeword is actually mapped may be shorter than the TTI.

In addition, when one slot or one mini-slot is called the TTI, one or more TTIs (i.e., one or more slots, or one or more mini-slots) may be the minimum time unit of scheduling. Further, the number of slots (the number of mini-slots) constituting the minimum time unit of scheduling may be controlled.

The TTI having a time length of 1 ms may be called ordinary TTI (TTI in LTE Rel.8-12), normal TTI, long TTI, ordinary subframe, normal subframe, long subframe or the like. The TTI shorter than the ordinary TTI may be called reduced TTI, short TTI, partial or fractional TTI, reduced subframe, short subframe, mini-slot, subslot or the like.

In addition, the long TTI (e.g., normal TTI, subframe, etc.) may be read with TTI having a time length exceeding 1 ms, and the short TTI (e.g., reduced TTI, etc.) may be read with TTI having a TTI length of 1 ms or more and less than the TTI length of the long TTI.

The resource block (RB) is a resource allocation unit in the time domain and frequency domain, and may include a single or a plurality of contiguous subcarriers in the frequency domain. Further, the RB may include a single or a plurality of symbols in the time domain, and may be a length of 1 slot, 1 mini-slot, 1 subcarrier, or 1 TTI. Each of 1 TTI and 1 subframe may be comprised of a single or a plurality of resource blocks. In addition, a single or a plurality of RBs may be called a physical resource block (PRB: Physical RB), subcarrier group (SCG: Sub-Carrier Group), Resource Element Group (REG), PRB pair, RB pair and the like.

Further, the resource block may be comprised of a single or a plurality of resource elements (RE: Resource Element). For example, 1 RE may be a radio resource region of 1 subcarrier and 1 symbol.

In addition, structures of the above-mentioned radio frame, subframe, slot, mini-slot and symbol are only illustrative. For example, it is possible to modify, in various manners, configurations of the number of subframes included in the radio frame, the number of slots per subframe or radio frame, the number of mini-slots included inside the slot, the numbers of symbols and RBs included in the slot or mini-slot, the number of subcarriers included in the RB, the number of symbols within the TTI, the symbol length, the cyclic prefix (CP) length and the like.

Further, the information, parameter and the like explained in the present Description may be expressed by an absolute value, may be expressed by a relative value from a predetermined value, or may be expressed by another corresponding information. For example, the radio resource may be indicated by a predetermined index. Further, equations using these parameters and the like may be different from those explicitly disclosed in the present Description.

The names used in the parameter and the like in the present Description are not restrictive in any respects. For example, it is possible to identify various channels (PUCCH (Physical Uplink Control Channel), PDCCH (Physical Downlink Control Channel) and the like) and information elements, by any suitable names, and therefore, various names assigned to these various channels and information elements are not restrictive in any respects.

The information, signal and the like explained in the present Description may be represented by using any of various different techniques. For example, the data, order, command, information, signal, bit, symbol, chip and the like capable of being described over the entire above-mentioned explanation may be represented by voltage, current, electromagnetic wave, magnetic field or magnetic particle, optical field or photon, or any combination thereof.

Further, the information, signal and the like are capable of being output from a higher layer to a lower layer, and/or from the lower layer to the higher layer. The information, signal and the like may be input and output via a plurality of network nodes.

The input/output information, signal and the like may be stored in a particular place (e.g., memory), or may be managed with a management table. The input/output information, signal and the like are capable of being rewritten, updated or edited. The output information, signal and the like may be deleted. The input information, signal and the like may be transmitted to another apparatus.

Notification of the information is not limited to the Aspects/Embodiment described in the present Description, and may be performed by another method. For example, notification of the information may be performed using physical layer signaling (e.g., Downlink Control Information (DCI), Uplink Control Information (UCI)), higher layer signaling (e.g., RRC (Radio Resource Control) signaling, broadcast information (Master Information Block (MIB), System Information Block (SIB) and the like), MAC (Medium Access Control) signaling), other signals, or combination thereof.

In addition, the physical layer signaling may be called L1/L2 (Layer 1/Layer 2) control information (L1/L2 control signal), L1 control information (L1 control signal) and the like. Further, the RRC signaling may be called RRC message, and for example, may be RRC connection setup (RRC Connection Setup) message, RRC connection reconfiguration (RRC Connection Reconfiguration) message, and the like. Furthermore, for example, the MAC signaling may be notified by MAC Control Element (MAC CE).

Further, notification of predetermined information (e.g., notification of "being X") is not limited to notification that is performed explicitly, and may be performed implicitly (e.g., notification of the predetermined information is not performed, or by notification of different information).

The decision may be made with a value ("0" or "1") expressed by 1 bit, may be made with a Boolean value represented by true or false, or may be made by comparison with a numerical value (e.g., comparison with a predetermined value).

Irrespective of that the software is called software, firmware, middle-ware, micro-code, hardware descriptive term, or another name, the software should be interpreted widely to mean a command, command set, code, code segment, program code, program, sub-program, software module, application, software application, software package, routine, sub-routine, object, executable file, execution thread, procedure, function and the like.

Further, the software, command, information and the like may be transmitted and received via a transmission medium. For example, when the software is transmitted from a website, server or another remote source using wired techniques (coaxial cable, optical fiber cable, twisted pair, Digital Subscriber Line (DSL) and the like) and/or wireless techniques (infrared, microwave and the like), these wired techniques and/or wireless techniques are included in the definition of the transmission medium.

The terms of "system" and "network" used in the present Description are used interchangeably.

In the present Description, the terms of "Base Station (BS)", "radio base station", "eNB", "gNB", "cell", "sector", "cell group", "carrier" and "component carrier" are capable of being used interchangeably. There is the case where the base station is called by the terms of fixed station, NodeB, eNodeB (eNB), access point, transmission point, reception point, femto-cell, small cell and the like.

The base station is capable of accommodating a single or a plurality of (e.g., three) cells (also called the sector). When the base station accommodates a plurality of cells, the entire coverage area of the base station is capable of being divided into a plurality of smaller areas, and each of the smaller areas is also capable of providing communication services by a base station sub-system (e.g., small base station (RRH: Remote Radio Head) for indoor use). The term of "cell" or "sector" refers to a part or the whole of coverage area of the base station and/or base station sub-system that performs communication services in the coverage.

In the present Description, the terms of "Mobile Station (MS)", "user terminal", "User Equipment (UE)", and "terminal" are capable of being used interchangeably. There is the case where the base station is called by the terms of fixed station, NodeB, eNodeB (eNB), access point, transmission point, reception point, femto-cell, small cell and the like.

There is the case where the Mobile Station may be called using a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms, by the person skilled in the art.

Further, the radio base station in the present Description may be read with the user terminal. For example, each Aspect/Embodiment of the present invention may be applied to a configuration where communication between the radio base station and the user terminal is replaced with communication among a plurality of user terminals (D2D: Device-to-Device). In this case, the functions that the above-mentioned radio base station 10 has may be the configuration that the user terminal 20 has. Further, the words of "up", "down" and the like may be read with "side". For example, the uplink channel may be read with a side channel.

Similarly, the user terminal in the present Description may be read with the radio base station. In this case, the functions that the above-mentioned user terminal 20 has may be the configuration that the radio base station 10 has.

In the present Description, particular operation performed by the base station may be performed by the upper node in some case. In a network comprised of a single or a plurality of network nodes having the base station, it is obvious that various operations performed for communication with the terminal are capable of being performed by the base station, one or more network nodes (e.g., MME (Mobility Management Entity), S-GW (Serving-Gateway) and the like are considered, but the invention is not limited thereto) except the base station, or combination thereof.

Each Aspect/Embodiment explained in the present Description may be used alone, may be used in combination, or may be switched and used according to execution. Further, with respect to the processing procedure, sequence, flowchart and the like of each Aspect/Embodiment explained in the present Description, unless there is a contradiction, the order may be changed. For example, with respect to the methods explained in the present Description, elements of various steps are presented in illustrative order, and are not limited to the presented particular order.

Each Aspect/Embodiment explained in the present Description may be applied to LTE (Long Term Evolution), LTE-A (LTE-Advanced), LTE-B (LTE-Beyond), SUPER 3G, IMT-AdvaNced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Registered Trademark) (Global System for Mobile communications), CDMA 2000, UMB (Ultra Mobile Broadband), IEEE 802.11 (Wi-Fi (Registered Trademark)), IEEE 802.16 (WiMAX (Registered Trademark)), IEEE 802.20, UWB (Ultra-WideBand), Bluetooth (Registered Trademark), system using another proper radio communication method and/or the next-generation system extended based thereon.

The description of "based on" used in the present Description does not mean "based on only", unless otherwise specified. In other words, the description of "based on" means both of "based on only" and "based on at least".

Any references to elements using designations of "first", "second" and the like used in the present Description are not intended to limit the amount or order of these elements overall. These designations are capable of being used in the present Description as the useful method to distinguish between two or more elements. Accordingly, references of first and second elements do not mean that only two elements are adopted, or that the first element should be prior to the second element in any manner.

There is the case where the term of "determining" used in the present Description includes various types of operation. For example, "determining" may be regarded as "determining" calculating, computing, processing, deriving, investigating, looking up (e.g., search in a table, database or another data structure), ascertaining and the like. Further, "determining" may be regarded as "determining" receiving (e.g., receiving information), transmitting (e.g., transmitting information), input, output, accessing (e.g., accessing data in memory) and the like. Furthermore, "determining" may be regarded as "determining" resolving, selecting, choosing, establishing, comparing and the like. In other words, "determining" may be regarded as "determining" some operation.

The terms of "connected" and "coupled" used in the present Description or any modifications thereof mean direct or indirect every connection or coupling among two or more elements, and are capable of including existence of one or more intermediate elements between two mutually "connected" or "coupled" elements. Coupling or connection between elements may be physical, may be logical or may be combination thereof. For example, "connection" may be read with "access". In the case of using in the present Description, it is possible to consider that two elements are mutually "connected" or "coupled", by using one or more electric wires, cable and/or print electric connection, and as some non-limited and non-inclusive examples, electromagnetic energy having wavelengths in a radio frequency region, microwave region and light (both visible and invisible) region.

In the case of using "including", "comprising" and modifications thereof in the present Description or the scope of the claims, as in the term of "provided with", these terms are intended to be inclusive. Further, the term of "or" used in the present Description or the scope of the claims is intended to be not exclusive OR.

As described above, the present invention is described in detail, but it is obvious to a person skilled in the art that the invention is not limited to the Embodiment described in the present Description. The invention is capable of being carried into practice as modified and changed aspects without departing from the subject matter and scope of the invention defined by the descriptions of the scope of the claims. Accordingly, the descriptions of the present Description are intended for illustrative explanation, and do not have any restrictive meaning to the invention.

The invention claimed is:

1. A terminal comprising:
a receiver that receives a downlink control information and a downlink shared channel that is scheduled by the downlink control information; and
a processor that determines an allocation of the downlink shared channel in a time domain based on a first timing indicated by a first time unit and a second timing indicated by a second time unit that are obtained from information notified by the downlink control information,
wherein the first timing is defined based on a numerology of the downlink shared channel.

2. The terminal according to claim 1, wherein the first time unit is a slot and the second time unit is a symbol.

3. The terminal according to claim 2, wherein
the processor further determines a given slot to which the downlink shared channel is scheduled based on a slot in which the downlink control information is transmitted and an offset obtained from the information notified in the downlink control information; and
determines a symbol to which the downlink shared channel is allocated based on the information notified by the downlink control information.

4. The terminal according to claim 1, wherein
the processor further determines a given slot to which the downlink shared channel is scheduled based on a slot in which the downlink control information is transmitted and an offset obtained from the information notified in the downlink control information; and
determines a symbol to which the downlink shared channel is allocated based on the information notified by the downlink control information.

5. The terminal according to claim 4, wherein the processor further determines, using a start of the given slot as a reference timing, the symbol to which the downlink shared channel is allocated based on the information notified by the downlink control information.

6. A terminal comprising:
a receiver that receives a downlink control information that is used for scheduling an uplink shared channel; and
a processor that determines an allocation of the uplink shared channel in a time domain based on a first timing indicated by a first time unit and a second timing indicated by a second time unit that are obtained from information notified by the downlink control information,
wherein the first timing is defined based on a numerology of the uplink shared channel.

7. The terminal according to claim 6, wherein the first time unit is a slot and the second time unit is a symbol.

8. The terminal according to claim 7, wherein
the processor further determines a given slot to which the uplink shared channel is scheduled based on a slot in which the downlink control information is transmitted and an offset obtained from the information notified in the downlink control information; and
determines a symbol to which the uplink shared channel is allocated based on the information notified by the downlink control information.

9. The terminal according to claim 6, wherein
the processor further determines a given slot to which the uplink shared channel is scheduled based on a slot in which the downlink control information is transmitted and an offset obtained from the information notified in the downlink control information; and
determines a symbol to which the uplink shared channel is allocated based on the information notified by the downlink control information.

10. The terminal according to claim 9, wherein the processor further determines, using a start of the given slot as a reference timing, the symbol to which the uplink shared channel is allocated based on the information notified by the downlink control information.

11. A radio communication method comprising:
receiving a downlink control information and a downlink shared channel that is scheduled by the downlink control information; and
determining an allocation of the downlink shared channel in a time domain based on a first timing indicated by a first time unit and a second timing indicated by a second time unit that are obtained from information notified by the downlink control information,
wherein the first timing is defined based on a numerology of the downlink shared channel.

12. A radio base station comprising:
a transmitter that transmits a downlink control information and a downlink shared channel that is scheduled by the downlink control information; and
a processor that controls an allocation of the downlink shared channel in a time domain based on a first timing indicated by a first time unit and a second timing indicated by a second time unit that are obtained from information included in the downlink control information,
wherein the first timing is defined based on a numerology of the downlink shared channel.

13. A radio communication system comprising a radio base station and a terminal, wherein
the base station comprises:
a transmitter that transmits a downlink control information and a downlink shared channel that is scheduled by the downlink control information; and
a processor of the base station that controls an allocation of the downlink shared channel in a time domain based on a first timing indicated by a first time unit and a second timing indicated by a second time unit that are obtained from information included in the downlink control information; and
the terminal comprises:
a receiver that receives the downlink control information and the downlink shared channel that is scheduled by the downlink control information; and
a processor of the terminal that determines an allocation of the downlink shared channel in a time domain based on the first timing indicated by the first time unit and the second timing indicated by the second time unit that are obtained from information notified by the downlink control information,
wherein the first timing is defined based on a numerology of the downlink shared channel.

* * * * *